(12) United States Patent
Singer et al.

(10) Patent No.: US 7,594,012 B2
(45) Date of Patent: *Sep. 22, 2009

(54) SYSTEM FOR COLLECTING, ANALYZING, AND REPORTING HIGH VOLUME MULTI-WEB SERVER USAGE

(75) Inventors: Barry Singer, Princeton, NJ (US); Glen Gable, Mommouth Junction, NJ (US); J. David Sherman, Edison, NJ (US); Susan Rico-Connolly, Villanova, PA (US); Akiva Shmuelov, New York, NY (US); Vinith Nayak, Edison, NJ (US)

(73) Assignee: Merrill Lynch & Company, New York, NY (US)

( * ) Notice: Subject to any disclaimer, the term of this patent is extended or adjusted under 35 U.S.C. 154(b) by 649 days.

This patent is subject to a terminal disclaimer.

(21) Appl. No.: 10/917,838

(22) Filed: Aug. 13, 2004
(Under 37 CFR 1.47)

(65) Prior Publication Data
US 2005/0125531 A1  Jun. 9, 2005

Related U.S. Application Data

(63) Continuation of application No. 09/346,145, filed on Jul. 9, 1999, now Pat. No. 6,789,115.

(51) Int. Cl.
*G06F 15/16* (2006.01)
(52) U.S. Cl. .................... 709/224; 707/10; 707/102
(58) Field of Classification Search .......... 709/224, 709/226; 707/10, 102
See application file for complete search history.

(56) References Cited

U.S. PATENT DOCUMENTS

| | | | | |
|---|---|---|---|---|
| 5,884,301 | A * | 3/1999 | Takano | 707/3 |
| 6,032,159 | A * | 2/2000 | Rivlin | 707/204 |
| 6,112,238 | A * | 8/2000 | Boyd et al. | 709/224 |
| 6,173,283 | B1 * | 1/2001 | Kasso et al. | 707/10 |
| 6,205,447 | B1 * | 3/2001 | Malloy | 707/102 |
| 6,253,211 | B1 * | 6/2001 | Gillies et al. | 707/201 |
| 6,317,787 | B1 * | 11/2001 | Boyd et al. | 709/224 |
| 6,341,310 | B1 * | 1/2002 | Leshem et al. | 709/223 |
| 6,374,359 | B1 * | 4/2002 | Shrader et al. | 713/201 |
| 6,393,479 | B1 * | 5/2002 | Glommen et al. | 709/224 |
| 7,272,625 | B1 * | 9/2007 | Hannel et al. | 709/200 |

* cited by examiner

*Primary Examiner*—Salad Abdullahi
(74) *Attorney, Agent, or Firm*—Michael A. Springs

(57) ABSTRACT

A system for capturing, analyzing, storing and reporting system-users' usage of Multiple internet and/or intranet web servers. At each web server in the system, the actions by the system-user create a server log that is processed by the system on a continuous basis. The processing at the server may include, by way of illustration, filtering the logs of about 75 percent of the data and decrypting a system-user's cookie. On a periodic basis, one or more collection servers in the system copy the processed log files from each web server on the system, zip the files, and transfer the files to an analysis server. After the collection is complete, an analysis server processes the data and stores it in a relational database that supports various user specified daily, monthly and quarterly reports of the usage data.

10 Claims, 48 Drawing Sheets

WEB USAGE REPORTS

DAILY SUMMARY REPORTS: [SUNDAY JUNE 20, 1999] [SUBMIT]

WEEKLY SUMMARY REPORTS: [06/20/1999 - 06/26/1999] [SUBMIT QUERY]

REQUEST BY CONTENT CATEGORY BETWEEN DATES: [19990615 AND 19990618] [SUBMIT]

AVERAGE REQUEST PER USER BY OFFICE BETWEEN DATES: [19990615 AND 19990618] [SUBMIT]

USAGE BY HOUR BETWEEN DATES: [19990615 AND 19990618] [SUBMIT]

USERS BY USAGE BETWEEN DATES: [19990615 AND 19990618] [SUBMIT]

SHOW USAGE PER USER FOR OFFICE 1, BETWEEN DATES: [19990615 AND 19990618] [SUBMIT]

SHOW REQUESTS FOR USER ID, M013, BETWEEN DATES: [19990615 AND 19990618] [SUBMIT]

SHOW USERS OF MARKET MARKET FOR OFFICE 1 BETWEEN DATES: [19990615 AND 19990618] [SUBMIT]

SHOW TOP 100 USERS OF MARKET FUNCTION, FUNCTION BETWEEN DATES: [19990615 AND 19990618] [SUBMIT]

FIG. 8

Daily Comprehensive Detail Report
*Sunday, June 20, 1999*

---

User Summary (Users by Hour, Total Users for Period)

Requests Broken Down by Tabs

Bandwidth Summary

---

Executive Summary

| | |
|---|---|
| Total Number of Requests: | 327,432 |
| Total Number of Users: | 20,265 |
| Avg Number of Requests/per Hour: | 13,643.00 |
| Peak Hour: | 11 AM with 55,443 requests |

| Top Applications | % of Total Requests | Total Requests |
|---|---|---|
| Markets: | 31.31% | 102,527 |
| Reports: | 10.33% | 33,821 |
| Accounts: | 5.42% | 17,739 |

FIG. 9A

DISTRIBUTION OF VISITS BY HOUR
(DOES NOT INCLUDE NON-AUTHENTICATED VISITS)

| HOUR | # OF VISITS | % OF VISITS |
|---|---|---|
| MIDNIGHT | 2 | 0.01% |
| 1 A.M. | 3 | 0.01% |
| 2 A.M. | 1 | 0.00% |
| 3 A.M. | 23 | 0.11% |
| 4 A.M. | 124 | 0.58% |
| 5 A.M. | 367 | 1.73% |
| 6 A.M. | 32 | 0.15% |
| 7 A.M. | 345 | 1.63% |
| 8 A.M. | 1,200 | 5.66% |
| 9 A.M. | 2,000 | 9.43% |
| 10 A.M. | 2,245 | 10.58% |
| 11 A.M. | 2,498 | 11.78% |
| 12 A.M. | 2,012 | 9.49% |
| 1 P.M. | 2,343 | 11.05% |
| 2 P.M. | 2,321 | 10.94% |
| 3 P.M. | 1,989 | 9.38% |
| 4 P.M. | 1,592 | 7.51% |
| 5 P.M. | 1,200 | 5.66% |
| 6 P.M. | 450 | 2.12% |
| 7 P.M. | 231 | 1.09% |
| 8 P.M. | 167 | 0.79% |
| 9 P.M. | 56 | 0.26% |
| 10 P.M. | 32 | 0.15% |
| 11 P.M. | 11 | 0.05% |
| TOTAL: | 21,244 | 100.16% |

Return to Main Menu

FIG. 9C

REQUESTS BY HOUR

| HOUR | # OF REQUESTS | % OF REQUESTS |
|---|---|---|
| MIDNIGHT | 12 | 0.00% |
| 1 A.M. | 100 | 0.03% |
| 2 A.M. | 10 | 0.00% |
| 3 A.M. | 14 | 0.00% |
| 4 A.M. | 1,200 | 0.37% |
| 5 A.M. | 2,300 | 0.70% |
| 6 A.M. | 592 | 0.18% |
| 7 A.M. | 3,400 | 1.04% |
| 8 A.M. | 13,345 | 4.08% |
| 9 A.M. | 23,567 | 7.20% |
| 10 A.M. | 45,676 | 13.95% |
| 11 A.M. | 55,443 | 16.93% |
| 12 A.M. | 34,007 | 10.39% |
| 1 P.M. | 33,345 | 10.18% |
| 2 P.M. | 28,563 | 8.72% |
| 3 P.M. | 25,784 | 7.87% |
| 4 P.M. | 23,453 | 7.16% |
| 5 P.M. | 20,430 | 6.24% |
| 6 P.M. | 11,162 | 3.41% |
| 7 P.M. | 2,344 | 0.72% |
| 8 P.M. | 1,122 | 0.34% |
| 9 P.M. | 1,143 | 0.35% |
| 10 P.M. | 320 | 0.10% |
| 11 P.M. | 100 | 0.03% |
| TOTAL: | 327,432 | 99.99% |

Return to Main Menu

FIG. 9E

DISTRIBUTION OF USERS BY HOUR

| HOUR | # OF USERS | % OF USERS |
|---|---|---|
| MIDNIGHT | 1 | 0.00% |
| 1 A.M. | 3 | 0.01% |
| 2 A.M. | 3 | 0.01% |
| 3 A.M. | 1 | 0.00% |
| 4 A.M. | 100 | 0.49% |
| 5 A.M. | 201 | 0.99% |
| 6 A.M. | 100 | 0.49% |
| 7 A.M. | 401 | 1.98% |
| 8 A.M. | 1,200 | 5.92% |
| 9 A.M. | 1,978 | 9.76% |
| 10 A.M. | 2,389 | 11.79% |
| 11 A.M. | 3,010 | 14.85% |
| 12 A.M. | 3,121 | 15.40% |
| 1 P.M. | 3,100 | 15.30% |
| 2 P.M. | 3,030 | 14.95% |
| 3 P.M. | 2,300 | 11.35% |
| 4 P.M. | 1,100 | 5.43% |
| 5 P.M. | 456 | 2.25% |
| 6 P.M. | 266 | 1.31% |
| 7 P.M. | 178 | 0.88% |
| 8 P.M. | 123 | 0.61% |
| 9 P.M. | 101 | 0.50% |
| 10 P.M. | 23 | 0.11% |
| 11 P.M. | 10 | 0.05% |

Return to Main Menu

FIG. 9G

MARKETS TAB

| FILE NAME | PAGE NAME | % OF REQUESTS | % OF REQUESTS |
|---|---|---|---|
| marketinformation.asp | Market Statistics Page | 78,653 | 24.0212% |
| marketquotes.asp | Market Real-Time Quotes | 23,874 | 7.2913% |
| | TOTAL: | 102,527 | 31.3125% |

Return to Main Menu

REPORTS TAB

| FILE NAME | PAGE NAME | % OF REQUESTS | % OF REQUESTS |
|---|---|---|---|
| getreports.asp | Report retrieval page | 30,984 | 9.4627% |
| payforreport.asp | Generate client report statement | 2,837 | 0.8664% |
| | TOTAL: | 33,821 | 10.3292% |

Return to Main Menu

ACCOUNTS TAB

| FILE NAME | PAGE NAME | % OF REQUESTS | % OF REQUESTS |
|---|---|---|---|
| accountquery.asp | Account balance per client | 9,345 | 2.8540% |
| accountbalance.asp | Check account balance | 8,394 | 2.5636% |
| | TOTAL: | 17,739 | 5.4176% |

Return to Main Menu

FIG. 91

BANDWIDTH BY HOUR

| HOUR | BYTES | % OF BANDWIDTH |
|---|---|---|
| MIDNIGHT | 13,200 | 0.01% |
| 1 A.M. | 19,800 | 0.01% |
| 2 A.M. | 20,000 | 0.01% |
| 3 A.M. | 187,600 | 0.08% |
| 4 A.M. | 13,321,400 | 6.02% |
| 5 A.M. | 19,345,600 | 8.74% |
| 6 A.M. | 22,145,600 | 10.01% |
| 7 A.M. | 23,145,300 | 10.46% |
| 8 A.M. | 23,452,300 | 10.60% |
| 9 A.M. | 34,532,100 | 15.60% |
| 10 A.M. | 53,246,700 | 24.06% |
| 11 A.M. | 61,356,700 | 27.72% |
| 12 A.M. | 63,342,100 | 28.62% |
| 1 P.M. | 55,162,000 | 24.92% |
| 2 P.M. | 57,543,400 | 26.00% |
| 3 P.M. | 52,435,200 | 23.69% |
| 4 P.M. | 49,653,200 | 22.43% |
| 5 P.M. | 33,123,400 | 14.96% |
| 6 P.M. | 12,321,400 | 5.57% |
| 7 P.M. | 10,063,400 | 4.55% |
| 8 P.M. | 2,342,500 | 1.06% |
| 9 P.M. | 1,324,100 | 0.60% |
| 10 P.M. | 324,200 | 0.15% |
| 11 P.M. | 43,300 | 0.02% |
| TOTAL: | 588,464,500 | 265.89% |

Return to Main Menu

FIG. 9K

*PSM Prototype Weekly Comprehensive Detail Report*
*Sunday, June 20, 1999 – Friday, June 25, 1999*

User Summary (Users by Day, Total Users for Period)

Requests Broken Down by Tabs

Bandwidth Summary

EXECUTIVE SUMMARY

Total Number of Requests: 1,407,411
Total Number of Users: 124,567

Total Number of Requests: 201,058.71
Total Number of Users: 11 AM with 332,685 requests
Total Number of Users: Sunday, June 20, 1999 with 327,432 requests Top Applications                % of Total Requests Markets:                        7.28%
Reports:                        2.40%
Accounts:                       1.26%

FIG. 10A

VISITS BY DAY TABLE
(DOES NOT INCLUDE NON-AUTHENTICATED VISITS)

| DATE | # OF VISITS | % OF VISITS |
|---|---|---|
| 06/20/1999 | 21,212 | 19.30% |
| 06/21/1999 | 20,121 | 18.31% |
| 06/22/1999 | 18,128 | 16.49% |
| 06/23/1999 | 19,109 | 17.38% |
| 06/24/1999 | 17,349 | 15.78% |
| 06/25/1999 | 14,001 | 12.74% |

Return to Main Menu

FIG. 10C

DISTRIBUTION OF VISITS BY HOUR
(DOES NOT INCLUDE NON-AUTHENTICATED VISITS)

| HOUR | # OF VISITS | % OF VISITS |
|---|---|---|
| MIDNIGHT | 12 | 0.01% |
| 1 A.M. | 18 | 0.02% |
| 2 A.M. | 6 | 0.01% |
| 3 A.M. | 138 | 0.13% |
| 4 A.M. | 744 | 0.68% |
| 5 A.M. | 2,202 | 2.00% |
| 6 A.M. | 192 | 0.17% |
| 7 A.M. | 2,070 | 1.88% |
| 8 A.M. | 7,200 | 6.55% |
| 9 A.M. | 12,000 | 10.92% |
| 10 A.M. | 13,470 | 12.25% |
| 11 A.M. | 14,988 | 13.64% |
| 12 A.M. | 12,072 | 10.98% |
| 1 P.M. | 14,058 | 12.79% |
| 2 P.M. | 13,926 | 12.67% |
| 3 P.M. | 11,934 | 10.86% |
| 4 P.M. | 9,552 | 8.69% |
| 5 P.M. | 7,200 | 6.55% |
| 6 P.M. | 2,700 | 2.46% |
| 7 P.M. | 1,386 | 1.26% |
| 8 P.M. | 1,002 | 0.91% |
| 9 P.M. | 336 | 0.31% |
| 10 P.M. | 192 | 0.17% |
| 11 P.M. | 66 | 0.06% |
| TOTAL: | 127,464 | 115.97% |

Return to Main Menu

FIG. 10E

REQUESTS BY DAY

| DATE | # OF REQUESTS | % OF REQUESTS |
|---|---|---|
| 06/20/1999 | 327,432 | 23.26% |
| 06/21/1999 | 245,245 | 17.43% |
| 06/22/1999 | 243,524 | 17.30% |
| 06/23/1999 | 192,314 | 13.66% |
| 06/24/1999 | 164,543 | 11.69% |
| 06/25/1999 | 234,353 | 16.65% |

Return to Main Menu

FIG. 10G

REQUESTS BY HOUR

| HOUR | # OF REQUESTS | % OF REQUESTS |
|---|---|---|
| MIDNIGHT | 72 | 0.01% |
| 1 A.M. | 600 | 0.04% |
| 2 A.M. | 60 | 0.00% |
| 3 A.M. | 84 | 0.01% |
| 4 A.M. | 7,200 | 0.51% |
| 5 A.M. | 13,800 | 0.98% |
| 6 A.M. | 3,552 | 0.25% |
| 7 A.M. | 20,400 | 1.45% |
| 8 A.M. | 80,070 | 5.69% |
| 9 A.M. | 141,402 | 10.05% |
| 10 A.M. | 274,056 | 19.47% |
| 11 A.M. | 332,658 | 23.64% |
| 12 A.M. | 204,042 | 14.50% |
| 1 P.M. | 200,070 | 14.22% |
| 2 P.M. | 171,378 | 12.18% |
| 3 P.M. | 154,704 | 10.99% |
| 4 P.M. | 140,718 | 10.00% |
| 5 P.M. | 122,580 | 8.71% |
| 6 P.M. | 66,972 | 4.76% |
| 7 P.M. | 14,064 | 1.00% |
| 8 P.M. | 6,732 | 0.48% |
| 9 P.M. | 6,858 | 0.49% |
| 10 P.M. | 1,920 | 0.14% |
| 11 P.M. | 600 | 0.04% |
| TOTAL: | 1,964,592 | 139.61% |

Return to Main Menu

FIG. 101

USERS BY DAY

| DATE | # OF USERS |
|---|---|
| 06/20/1999 | 20,265 |
| 06/21/1999 | 21,981 |
| 06/22/1999 | 19,238 |
| 06/23/1999 | 17,819 |
| 06/24/1999 | 22,198 |
| 06/25/1999 | 15,034 |

Return to Main Menu

FIG. 10K

DISTRIBUTION OF USERS BY HOUR

| HOUR | # OF USERS | % OF USERS |
|---|---|---|
| MIDNIGHT | 6 | 0.00% |
| 1 A.M. | 18 | 0.01% |
| 2 A.M. | 18 | 0.01% |
| 3 A.M. | 6 | 0.00% |
| 4 A.M. | 600 | 0.48% |
| 5 A.M. | 1,206 | 0.97% |
| 6 A.M. | 600 | 0.48% |
| 7 A.M. | 2,406 | 1.93% |
| 8 A.M. | 7,200 | 5.78% |
| 9 A.M. | 11,868 | 9.53% |
| 10 A.M. | 14,334 | 11.51% |
| 11 A.M. | 18,060 | 14.50% |
| 12 A.M. | 18,726 | 15.03% |
| 1 P.M. | 18,600 | 14.93% |
| 2 P.M. | 18,180 | 14.59% |
| 3 P.M. | 13,800 | 11.08% |
| 4 P.M. | 6,600 | 5.30% |
| 5 P.M. | 2,736 | 2.20% |
| 6 P.M. | 1,596 | 1.28% |
| 7 P.M. | 1,068 | 0.86% |
| 8 P.M. | 738 | 0.59% |
| 9 P.M. | 606 | 0.49% |
| 10 P.M. | 138 | 0.11% |
| 11 P.M. | 60 | 0.05% |

Return to Main Menu

FIG. 10M

MARKETS TAB

| FILE NAME | PAGE NAME | # OF REQUESTS | % OF REQUESTS |
|---|---|---|---|
| marketinformation.asp | Market Statistics Page | 78,653 | 5.5885% |
| marketquotes.asp | Market Real-Time Quotes | 23,874 | 1.6963% |
| | TOTAL: | 102,527 | 7.2848% |

Return to Main Menu

REPORTS TAB

| FILE NAME | PAGE NAME | # OF REQUESTS | % OF REQUESTS |
|---|---|---|---|
| getreports.asp | Report retrieval page | 30,984 | 2.2015% |
| payforreport.asp | Generate client report statement | 2,837 | 0.2016% |
| | TOTAL: | 33,821 | 2.4031% |

Return to Main Menu

ACCOUNTS TAB

| FILE NAME | PAGE NAME | # OF REQUESTS | % OF REQUESTS |
|---|---|---|---|
| accountquery.asp | Account balance per client | 9,345 | 0.6640% |
| accountbalance.asp | Check account balance | 8,394 | 0.5964% |
| | TOTAL: | 17,739 | 1.2604% |

Return to Main Menu

FIG. 100

BANDWIDTH BY HOUR

| HOUR | BYTES | % OF BANDWIDTH |
|---|---|---|
| MIDNIGHT | 79,200 | 0.01% |
| 1 A.M. | 118,800 | 0.01% |
| 2 A.M. | 120,000 | 0.01% |
| 3 A.M. | 1,125,600 | 0.08% |
| 4 A.M. | 79,928,400 | 6.02% |
| 5 A.M. | 116,073,600 | 8.74% |
| 6 A.M. | 132,873,600 | 10.01% |
| 7 A.M. | 138,871,800 | 10.46% |
| 8 A.M. | 140,713,800 | 10.60% |
| 9 A.M. | 207,192,600 | 15.60% |
| 10 A.M. | 319,480,200 | 24.06% |
| 11 A.M. | 368,140,200 | 27.72% |
| 12 A.M. | 380,052,600 | 28.62% |
| 1 P.M. | 330,972,000 | 24.92% |
| 2 P.M. | 345,260,400 | 26.00% |
| 3 P.M. | 314,611,200 | 23.69% |
| 4 P.M. | 297,919,200 | 22.43% |
| 5 P.M. | 198,740,400 | 14.96% |
| 6 P.M. | 73,928,400 | 5.57% |
| 7 P.M. | 60,380,400 | 4.55% |
| 8 P.M. | 14,055,000 | 1.06% |
| 9 P.M. | 7,944,600 | 0.60% |
| 10 P.M. | 1,945,200 | 0.15% |
| 11 P.M. | 259,800 | 0.02% |
| TOTAL: | 3,530,787,000 | 265.89% |

Return to Main Menu

FIG. 10Q

REQUEST BY CONTENT

Markets Function

| Subfunction Name | # of Requests | % of Requests |
|---|---|---|
| Market Statistics Page | 78,653 | 24.0212% |
| Market Real-Time Quotes | 23,874 | 7.2913% |
| Total: | 102,527 | 31.3125% |

Reports Function

| Subfunction Name | # of Requests | % of Requests |
|---|---|---|
| Report retrieval page | 30,984 | 9.4627% |
| Generate client report statement | 2,837 | 0.8664% |
| Total: | 33,821 | 10.3292% |

Accounts Function

| Subfunction Name | # of Requests | % of Requests |
|---|---|---|
| Account balance per client | 9,345 | 2.8540% |
| Check account balance | 8,394 | 2.5636% |
| Total: | 17,739 | 5.4176% |

FIG. 11

AVERAGE REQUESTS PER USER BY OFFICE

Sunday, June 20, 1999 – Friday, June 25, 1999

Displaying page 1 of page(s) Records 1 – 5

| Office Name | Average Requests | Total Requests | Office Number | Number of Users |
|---|---|---|---|---|
| Madison, WI | 200 | 3200 | 1 | 16 |
| Detroit, MI | 100 | 4500 | 2 | 45 |
| Cleveland, OH | 150 | 3250 | 3 | 21 |
| Rochester, NY | 100 | 1100 | 4 | 11 |
| Denver, CO | 50 | 1650 | 5 | 13 |

Sort all records by [Office Number] in a [Ascending] order. [Sort]

5 record(s) found.

FIG. 12

Usage by Hour

Date Range: 19990608 – 19990609

Bar Graph of Results

| Hour | Number of Requests |
|---|---|
| Midnight | 0 |
| 1 a.m. | 0 |
| 2 a.m. | 241 |
| 3 a.m. | 403 |
| 4 a.m. | 302 |
| 5 a.m. | 575 |
| 6 a.m. | 1275 |
| 7 a.m. | 1620 |

FIG. 13

TOP 100 BY USAGE

Sunday, June 20, 1999 – Friday, June 25, 1999

Currently sorted by Total Requests – Descending and displaying all records
Displaying page 1 of 1 page(s). Records 1–10
Total of all requests: 11, 248

| User | User ID | Total Req. | Office Number | Office Name |
|---|---|---|---|---|
| Pamela Jacobson | M013 | 2,372 | 1 | Madison, WI |
| Jonathen Stairs | C002 | 1,300 | 3 | Cleveland, OH |
| William Martin | D011 | 1,283 | 2 | Detroit, MI |
| Barbara Anderson | R101 | 993 | 4 | Rochester, NY |
| Ellen Hannon | D007 | 986 | 2 | Detroit, MI |

Sort by [Total Requests] [Descending] [Sort]

Return this report using dates from [19990620] and [19990625] [Submit]

FIG. 14

USAGE PER USER BY OFFICE

Sunday, June 20, 1999 – Friday, June 25, 1999

Office Name: Madison, WI   Office Number: 1

Displaying page 1 of 1 page(s). Records 1-5

| User Name | User ID | Total Requests |
|---|---|---|
| Pamela Jacobson | M013 | 2372 |
| Lisa Uram | M004 | 435 |
| Albert Jones | M111 | 28 |
| Linda Puls | M135 | 13 |
| David Sylla | M117 | 5 |

Sort all records by [Total Requests] in a [Descending] order. [Sort]

FIG. 15

Requests associated with User ID M117

Sunday, June 20, 1999 — Friday, June 25, 1999

Office Name: Madison, WI    Office Number: 1

User Name: David Sylla    USERID: M117

Displaying page 1 of 1 page(s). Records 1-5

| Time Stamp | Function |
|---|---|
| 6/23/99 11:05:09 a.m. | Market Statistics |
| 6/23/99 11:05:09 a.m. | Account Balance Per Client |
| 6/23/99 11:05:09 a.m. | Generate Client Report Statement |
| 6/23/99 11:05:10 a.m. | Check Account Balance |
| 6/23/99 11:05:12 a.m. | Market Statistics |

Sort all records by [Time Stamp] [Ascending] order. [Sort]

FIG. 16

Users of Market Function for Office 1

Sunday, June 20, 1999 – Friday, June 25, 1999

Total Number of Usage using Market tab for office 1: 16

Average Number of Requests per user: 100

Total Number of Requests for all Users: 1600

| User Name | User ID | Number of Requests |
|---|---|---|
| Pamela Jacobson | M013 | 1300 |
| Lisa Urom | M004 | 270 |
| Albert Jones | M111 | 14 |
| Linda Puls | M135 | 5 |
| David Sylla | M117 | 2 |

FIG. 17

Top 100 Users of Market Function
Sunday, June 20, 1999 – Friday, June 25, 1999

| User Name | User ID | Office Number | Number of Requests |
|---|---|---|---|
| Pamela Jacobson | M013 | 1 | 1300 |
| Jonathon Stairs | C002 | 3 | 435 |
| William Martin | D011 | 2 | 340 |
| Barbara Anderson | R101 | 4 | 285 |
| Ellen Hannon | D007 | 2 | 276 |
| Greta Landis | N004 | 5 | 255 |
| Lisa Uram | M004 | 1 | 233 |

FIG. 18

SYSTEM FOR COLLECTING, ANALYZING, AND REPORTING HIGH VOLUME MULTI-WEB SERVER USAGE

CROSS REFERENCE TO RELATED APPLICATIONS

This application is a continuation of U.S. patent application Ser. No. 09/346,145 (now U.S. Pat. No. 6,789,115), filed Jul. 9, 1999. The entire contents of that application are incorporated herein by reference.

The present invention generally relates to a data processing system. More particularly, the present invention relates to a system for collecting and reporting web server usage statistics.

BACKGROUND OF THE INVENTION

Companies that rely on internet and/or intranet web servers as a key point of contact for their employees, customers and/or potential customers (collectively the "System-Users") need timely and accurate information about the interests and needs of their System-Users. Achieving this goal is a difficult challenge for companies with high volume multi-web server usage because the volume of web server usage data generated can be enormous. Thus, for these companies, a web usage analysis system must be able to process and store large amounts of web server usage data in an efficient manner or it will quickly become overwhelmed.

Programs exist today to analyze web server usage. The starting point for all these programs is the web server log. When the System-User of a web server makes a request for certain content, one or more entries are written in a log record, which records the System-User's request. The log entries for one request can be extensive because they contain the data for all pictures and graphical representations included in the content request. After the log entries are generated, they are stored sequentially in a log on the web server. The existing analysis programs perform their usage analysis function by retrieving these log records and preparing various reports based upon the usage as reflected in the log records. These programs may, or may not, store the data in databases prior to generating usage reports.

The available programs, however, have many limitations which make them of limited utility to companies with high volume multi-web server usage. The programs do not process the usage data fast enough to provide daily reporting because of the inefficient way in which these systems process web server usage data. The reasons for such inefficiencies include the absence of a process for: (1) filtering the data from the server; (2) reducing database size by creating summary data and deleting the details, and (3) minimizing the data that is stored through the use of reference tables.

A further limitation of these statistical programs is that they cannot generate reports over extended time periods. This precludes management from viewing usage information over various time periods such as weeks, months and quarters. In addition, management would also like to perform timely queries of usage data based on various date parameters. Existing packages provided limited capability to do this because of the manner in which these programs store and maintain usage data.

A further limitation with these programs is that many companies would like to identify the user of the web server so that they can match this user information with other information that is maintained relating to the user. The existing programs contain no method of identifying the user.

Finally, the existing systems all require that a company devote significant human resources to schedule and operate the process of recording, collecting and analyzing web server usage from multiple web servers.

SUMMARY AND OBJECTS OF THE PRESENT INVENTION

It is thus an object of the present invention to provide an efficient system for collecting, filtering, analyzing, and reporting web server usage data from one or more web servers.

It is a further object of the invention to provide an automated daily or periodic process by which web server usage data can be collected from multiple servers from one or more physical locations (whose identity can change on a daily or periodic basis) and loaded into databases that can be used to produce various reports.

It is a further object of the invention to minimize the data handled by the automated daily process by filtering unneeded usage data at the web server.

It is a further object of the invention to provide efficient querying by compacting the details in the database tables through the use of reference tables and minimizing the size of the database by generating summary data so that the details can be deleted periodically.

It is a further object of the invention to provide daily, weekly, monthly, and quarterly reports.

It is a further object of the invention to provide ad-hoc reports which permit users to specify their own date parameters.

It is a further object of the invention to identify the System-Users by decrypting the System User's cookie which allows the system to link the user with other information maintained on the system about the user to produce useful reports.

It is a further object of the invention to provide an automated process that requires minimal human intervention (other than setting system parameters) to perform the collection, analysis and reporting of web server usage.

The above and other objects of the present invention are realized through a system which uses software installed at each web server to filter the server usage data by removing unneeded file types such as pictures, thereby reducing the size of web server usage files by approximately 75 percent. The system allows the cookie decryption algorithm to be installed as part of the web server filtering program so that the system can identify the System-User.

On a daily or scheduled basis, the collection process collects the filtered usage records from all the servers on the system, further processes the usage data, and then transfers the data to the Analysis Server where the data is loaded into a relational database. The collection processes can be set to run automatically based on the time of day set for the process to run.

To support efficient querying and minimize the use of system resources, the Main Table in the database is kept compact by: (1) creating summary data so that the details in the Main Table can be deleted automatically on a periodic basis and (2) using reference tables so that only unique identifier values are stored in the Main Table. The system uses the reference tables to link the unique identifier value in the Main Table with the actual information stored in the reference tables. Summary Tables are created from the Main Table to support weekly, monthly and quarterly reporting of web site usage. The identity of the System-User is linked with other information maintained about the user to support various reports related to the System-User.

Other than setting system parameters and loading certain non-usage company and System-User information, the invention may be run without human intervention except for periodic maintenance.

The foregoing features and advantages of the instant invention may be more fully appreciated by reference to a specific embodiment thereof, as described hereinbelow in conjunction with the following figures of which:

BRIEF DESCRIPTION OF THE DRAWINGS

FIG. 8 depicts an illustrative copy of the Default Screen.

FIG. 11 depicts an illustrative copy of the Request by Content Report

FIG. 12 depicts an illustrative copy of the Average Request Per User by Office Report FIG. 13 depicts an illustrative copy of the Usage by Hour Report FIG. 14 depicts an illustrative copy of the User sorted by Usage Report FIG. 15 depicts an illustrative copy of the Usage Per User by Office Report FIG. 16 depicts an illustrative copy of the Requests Per User ID Report FIG. 17 depicts an illustrative copy of the Users of Function for an Office Report FIG. 18 depicts an illustrative copy of the Top 100 Users of a Function Report

DETAILED DESCRIPTION OF PRESENT INVENTION

Figure 1:
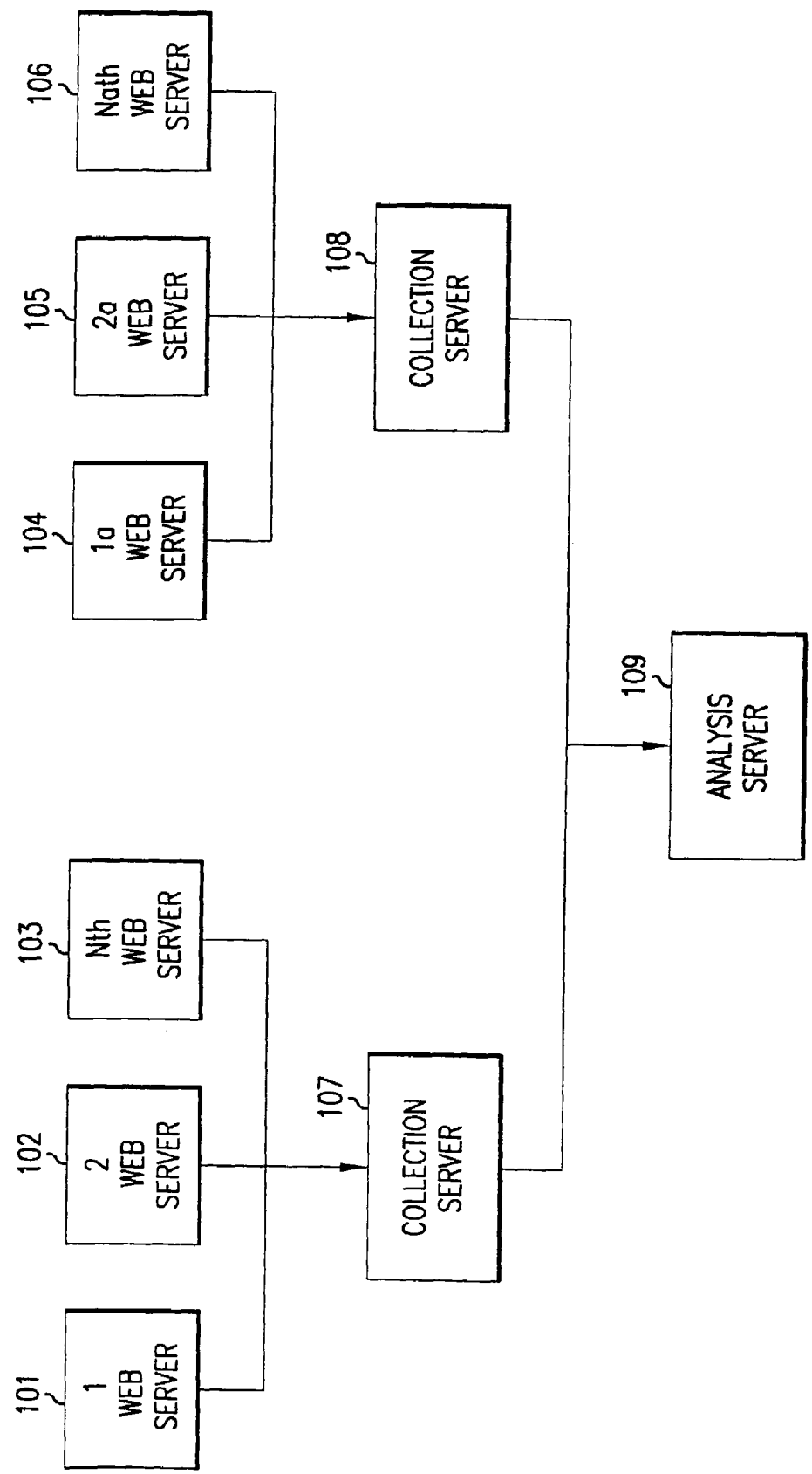
FIG. 1 is a hardware block diagram showing the interconnection of the computer systems which comprise the system.

The present invention is a web site usage data collection, analysis and reporting system. The specification describes a specific illustrative system which collects over 2.5 gigabytes per day of web server usage data from 54 web servers at two physical locations. The various components, specifications and operations of the system are defined in the drawings and the description set forth below.

The Computer Systems

The computer systems and their interconnections are depicted in FIG. 1. The three types of computer systems which are utilized by the invention include: (1) web servers (101-106); (2) Collection Servers (107-108), and (3) an Analysis Server (109). Illustratively, the invention may be practiced in the operational environment of 54 web servers, 2 Collection Servers, and one Analysis Server. The web servers are located at two physical locations. In the illustrative system, one Collection Server resides at each physical location to provide a collection process on the same network segment as the web servers, which increases the speed of collection. Although other combinations of hardware and software could be used, the following hardware and software used by the invention is described for purposes of illustration:

The web server hardware can be implemented using a Compaq Proliant 6500 4 cpu. The software on the web server may include any of: Microsoft Windows NT 4.0 Svc Pak 3, Microsoft Internet Information Server (IIS) V 3.0, and components written in Microsoft Visual C++ V 5.0.

The Collection Server hardware can be implemented using a Compaq Proliant 6500 4 cpu. The software on the web server may include any of: Microsoft Windows NT 4.0 Svc Pak 3, Microsoft Content Replication Server V 2.0, WinZip V 6.3, and Microsoft Visual Basic 5.0.

The Analysis Server hardware can be implemented using a Compaq Proliant 6500 4 cpu with 2 gigabytes of ram and 108 gigabytes of disk space and 15/30 DLT tape drive to do periodic backups of the database. The software on the Analysis Server may include any of: Microsoft Windows NT 4.0, Microsoft Content Replication Server V 2.0, Microsoft Developers Toolkit (WinAT), Microsoft Visual Basic V 5.0, Microsoft Internet Information Server (IIS) V 4.0, Microsoft SQL Server V 6.5 Svc Pak 4, and Chart FX V 3.0.

Collection of Visitor Usaze Data from the Web Server

Figure 2:
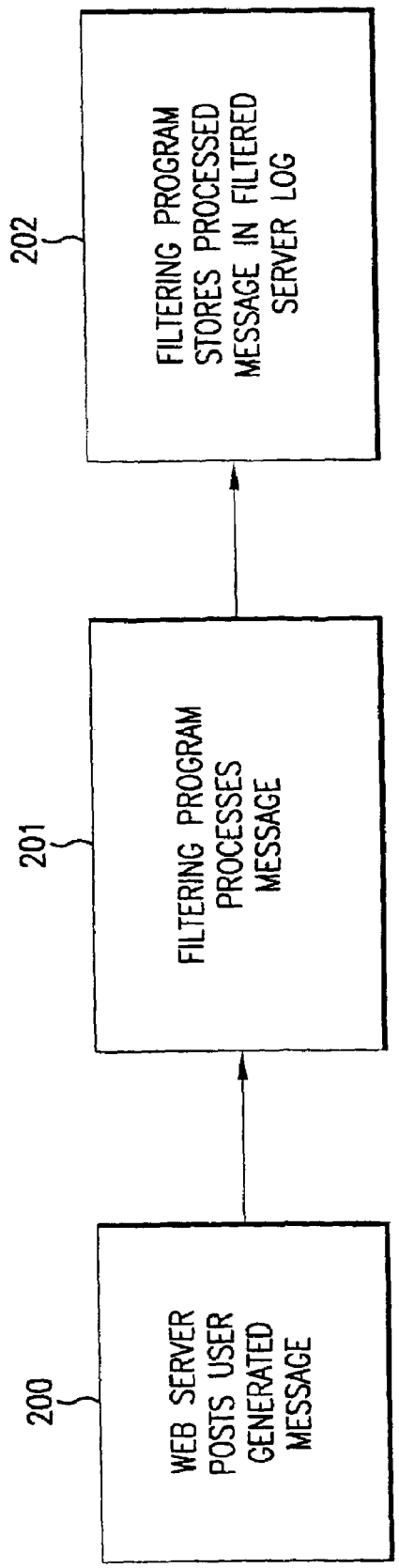
FIG. 2 is a flow chart showing the collection of System-User usage data from the web servers on the system.

The collection of System-User usage data from the web servers on the system is depicted in FIG. 2. On a web server, every System-User request is stored in a web server log. Although different formats can be used, the system described herein illustratively uses the Netscape Extended Logfile Format. An example of one line from an actual web server log is as follows:

11.147.39.69-[17/Apr/1998:09:31:01-0500] "GET/login/nps/ListViewer.htm IF4TTP/1.1" 304 50 "http://www.msfcom/login/nps/ListViewer" "Mozilla/4.0 (compatible; MSIE 4.0; Windows NT)" "MLUSERID=FR5-1476-2987 JOB=CMP"

This type of line is written for every action taken by a System-User of a web site. The breakdown of the above line is as follows:

| | |
|---|---|
| 1) 11.147.39.69 | IP Address of the System-User |
| 2) — | These fields not currently used |
| 3) [17/Apr/1998:09:31:01 | The Date and time stamp in 24-hour format |
| 4) -0500 | The Difference of WebServer time from Greenwich time |
| 5) "GET nps | GET or POST operation |
| 6) /login/mcr/ListViewer/ listviewer.htm HTTP/1.1" | This is the actual content requested by the visitor from the web site |
| 7) 304 | The Return Code from the request |
| 8) 50 | The number of Bytes returned |
| 9) "http://www.msf.com/login/ msf7List Viewer" | This is where the System-User was before the System-User came to the requested page. |
| 10) "Mozzila/4.0(compatible; MSIE 4.0; | Browser Info |
| 11) Windows NT)" | This is the Operating System Used by the System-User |
| 12) "USERID=FRS-1476 JOB=CMP" | The stored Cookie information |

Every web server on the system is installed with a program (the "Filtering Program"), which may be written in C++, that processes and filters web server usage data as it is created. When a user action is taken, the web server posts the user generated log (200). The Filtering Program then processes the message (201) and stores the usage information in a custom log record (202), as opposed to the standard log the web server would otherwise create. The advantage of processing the logs at the web server is that it reduces the size of the web server log files by around 75 percent. Thus, creating a custom log results in significantly reducing the time for the entire collection and reporting process to run because less data is being processed.

Figure 3:
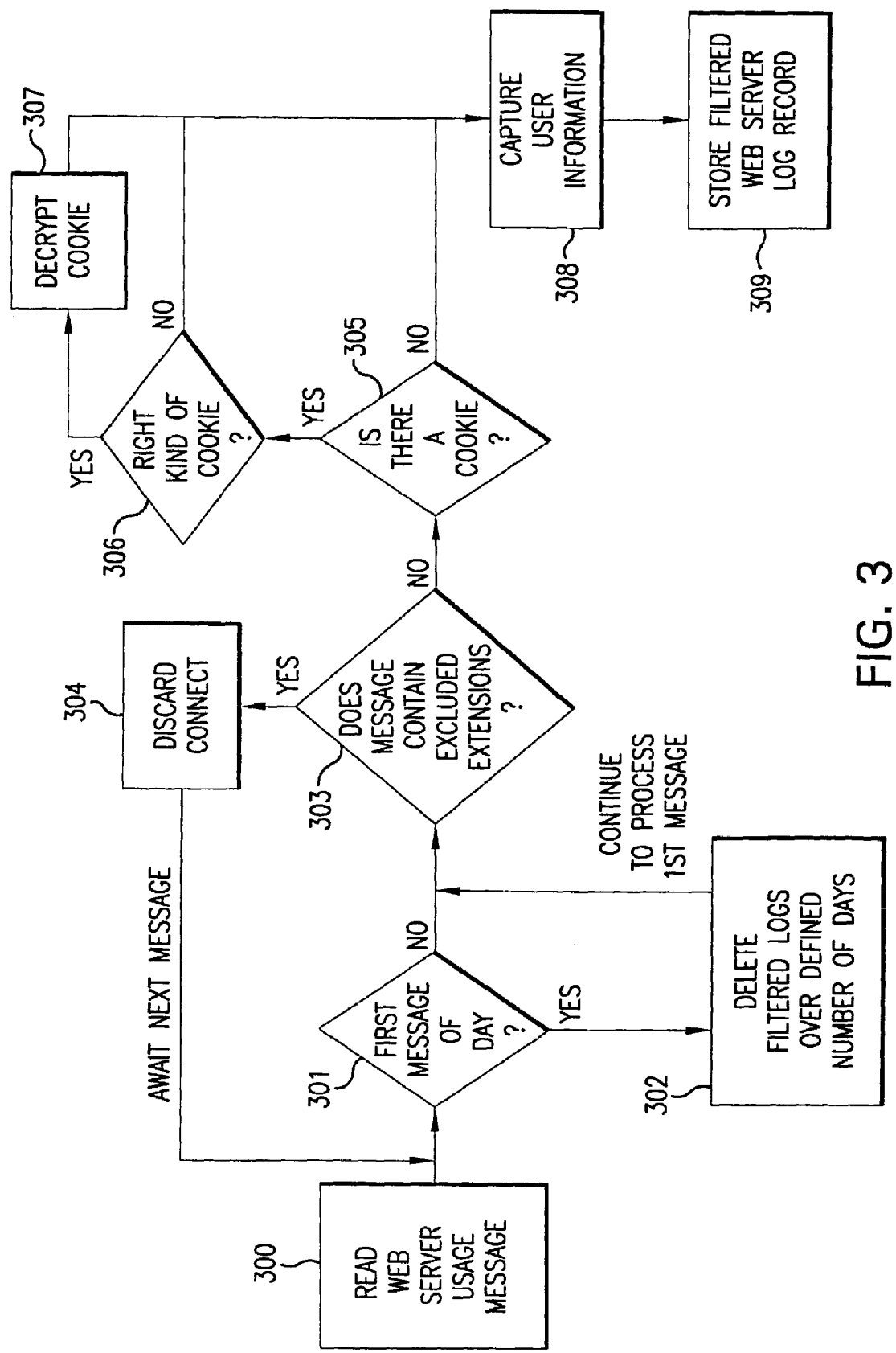
FIG. 3 is a flow chart showing the functions of the Filtering Program

The functions of the Filtering Program are depicted in FIG. 3. After the Filtering Program receives a message from the web server (300) that web server usage data has been created, the Filtering Program determines whether this is the first message of the day (301). If it is, the Filtering Program deletes data older than a preset number of days in the filtered log records (302). Next, the Filtering Program determines the file extensions for the content requested and deletes specified file extensions (303 & 304). For example, in the illustrative system, all files with ".GIF" extensions are deleted because these requests refer to pictures or graphical representations. The Filter Program then looks to determine whether or not the System-User has a cookie and whether it is the type of cookie the system is expecting (305 & 306). If there is no cookie or if the cookie is not of a kind the system is expecting, no decryption is performed. If a cookie is present and it is the right cookie information, the Filtering Program decrypts the cookie based on a decryption algorithm that is input into the Filtering Program (307). After decryption, the Filtering Program captures System-User information from the server log such as whether the System-User is from a secure path or non-secure path and whether the System-User is from a secure port or a non-secure port (308). This determination is made based on the IP address of the System-User. Finally, the Filtering Program stores the filtered record in a log and awaits the next System-User action (309).

Download Web Server Log Data Via the Collection Server to the Analysis Server

Figure 4:
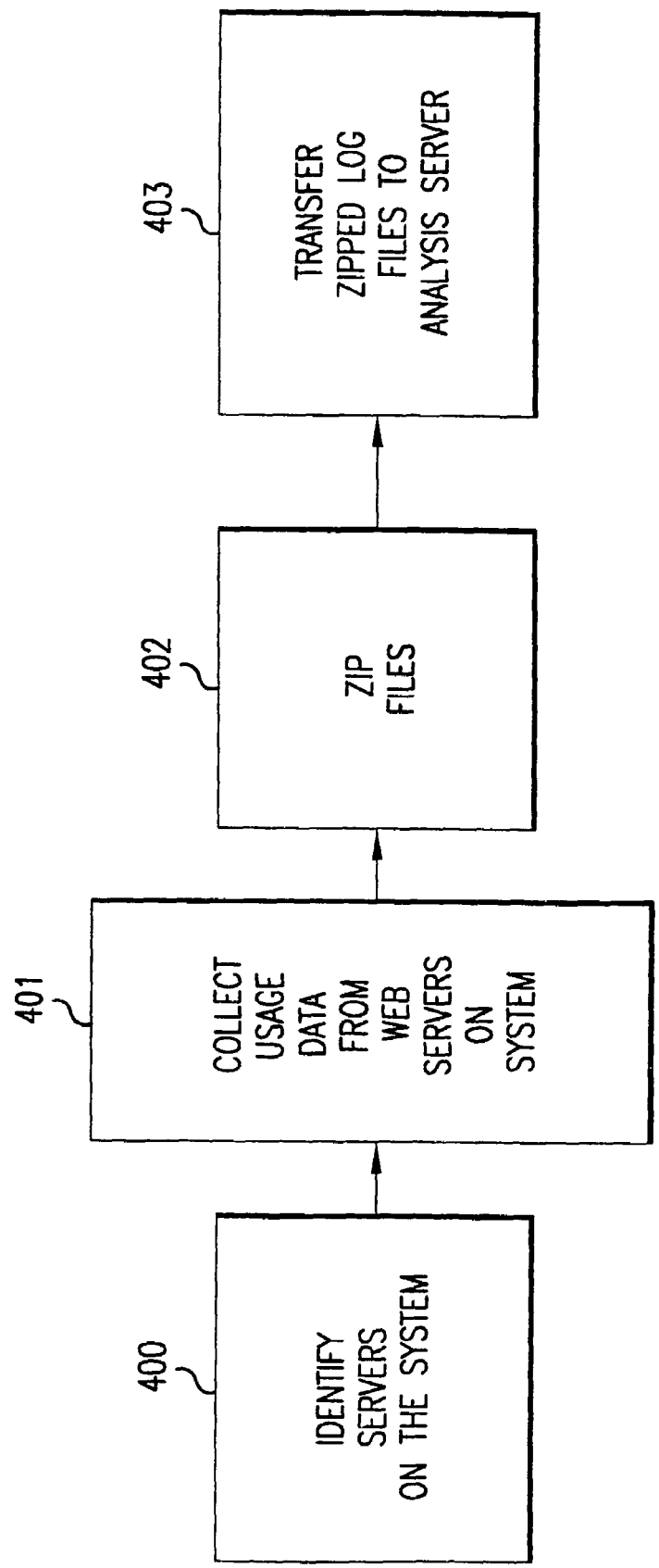
FIG. 4 is a flow chart showing the process of downloading usage data from the web servers to the Analysis Server.

The process of downloading web server log data from the Web Server to the Analysis Server is depicted in FIG. 4. At a predefined time, for example during the night and/or during periods of relatively low system usage, the Collection Servers start a batch program, the Server Identification Program, which does two things: (1) it reads the Server List on the Collection Server to determine the Web Servers that are at the same physical location as the Collection Server (400) and (2) creates another batch program, the Collection Program, which collects the filtered server logs from the web servers at the same physical location (401), zips the files using Winzip V 6.3 (402) and transfers the zipped files to the Analysis Server using Microsoft Content Replication Sever V 2.0.

The Server List is a file on the Collection Server that is updated when a new Web Server is added to the physical location of the Collection Server (403).

Processing of Web Server Data by the Analysis Server

Figure 5A:
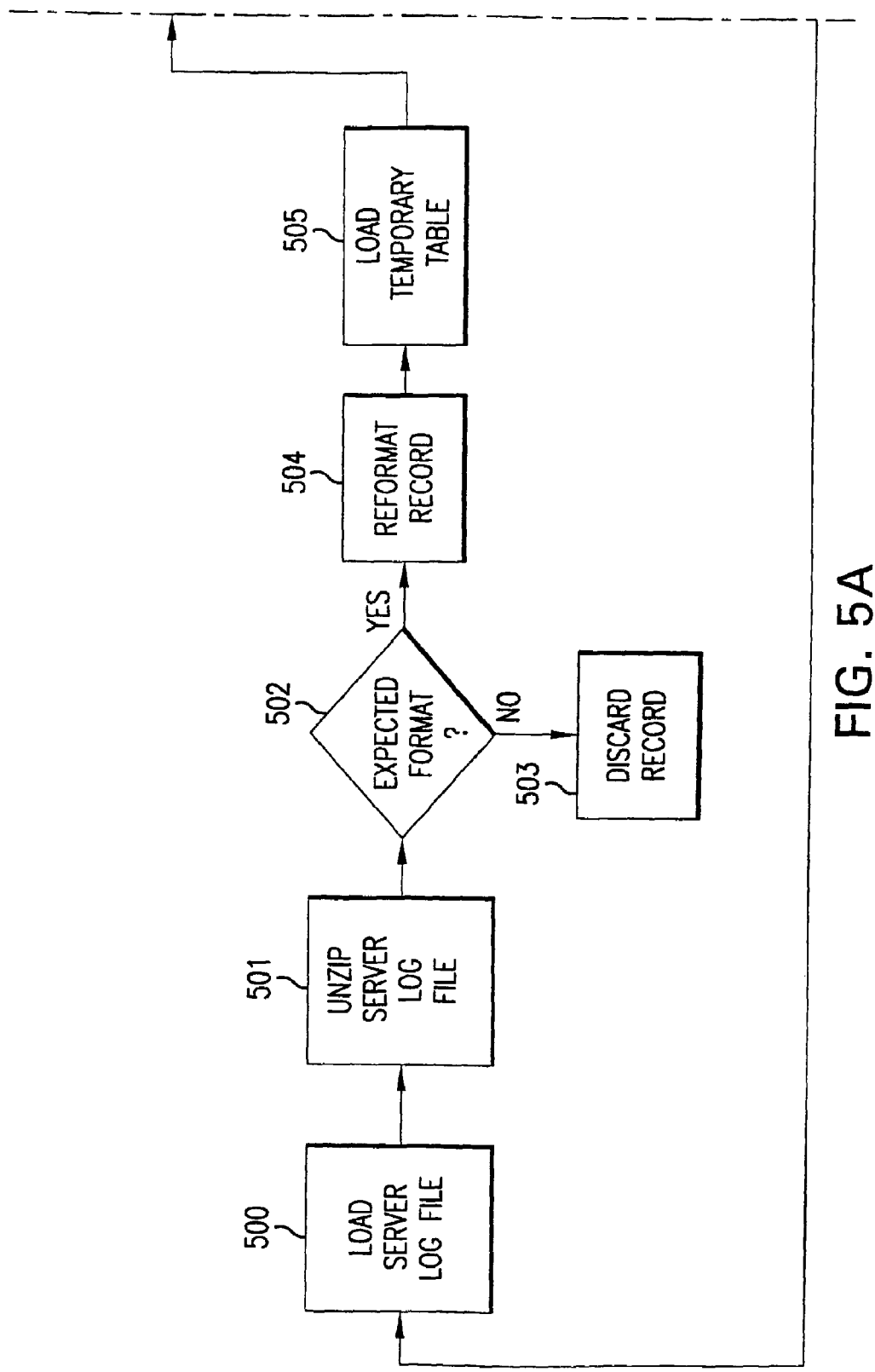
FIG. 5 is a flow chart showing the processing of usage data by the Analysis Server.
Figure 5B:
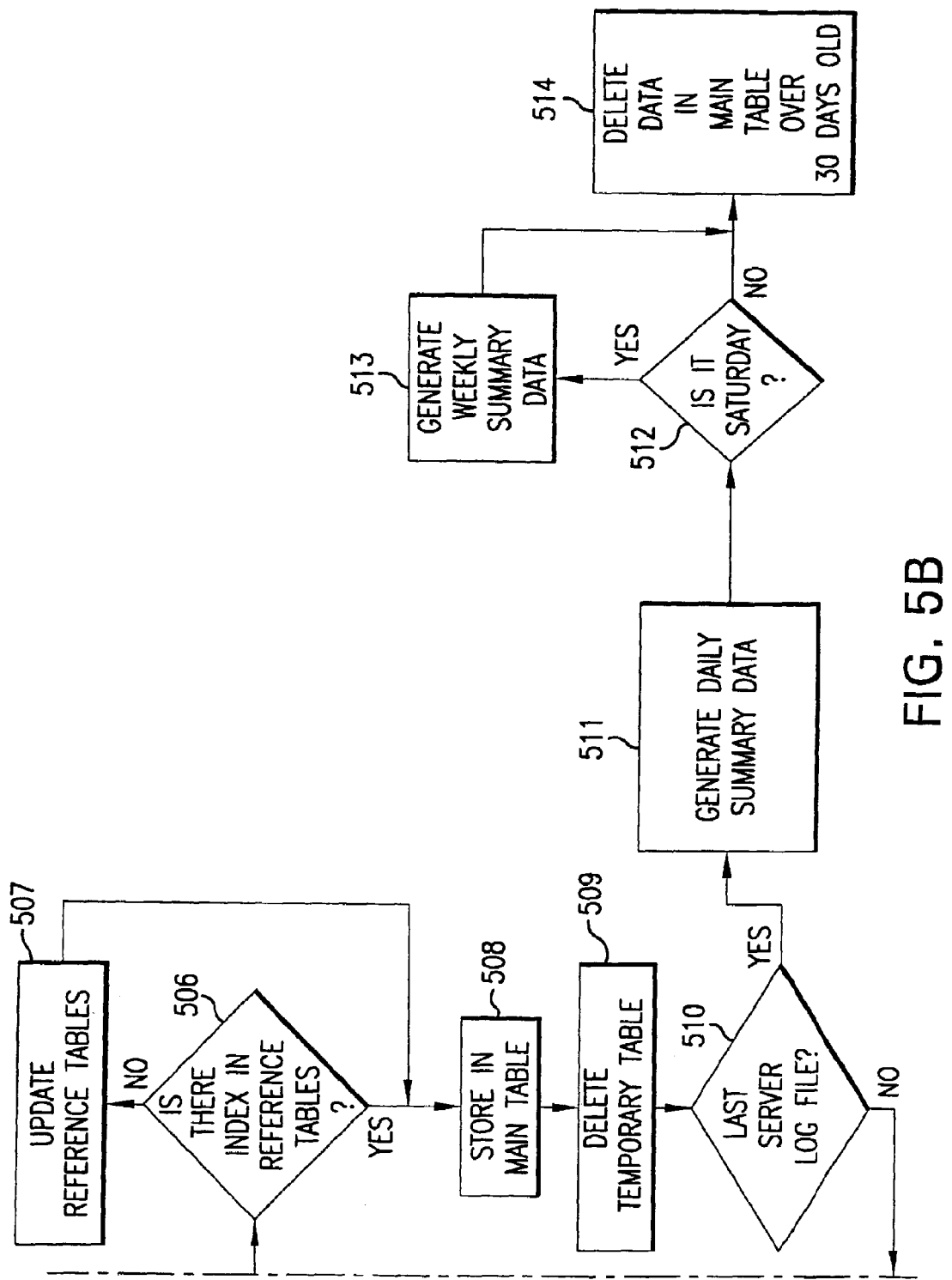

The processing steps performed at the Analysis Server on the web server usage data are depicted in FIG. 5. On a daily basis, upon completion of the Collection Process, the Analysis Server starts a batch program, the Web Server Setup Program. Although many techniques are available to start a batch process, an illustrative embodiment of the invention uses the scheduling software Win At to begin the automation process. The Web Server Setup Program determines what web server data are to be processed and creates another batch program, the Analysis Server Program, which loads the server usage into the SQL Database. The Analysis Server Program starts by processing the data in web server order. Starting with the first web server, the program loads the server log file (500) and performs the following steps:

(1) unzips the log files using, for example, Nico Mak's Winzip utility (501);

(2) filters the unzipped log files and discards records that are not in an expected format (502 & 503);

(3) reformats each line in such a way that the SQL Server Bulk Copy process (described below) can load the data into the SQL databases, which includes removing unused fields, changing the time stamp so that it is understood by SQL Server Bulk Copy as a Date/Timestamp, and separating all fields with Tabs instead of inconsistent delimiting of the Netscape extended format (504);

(4) triggers the Bulk Copy Load (BCP) utility to load the filtered web server logs into a temporary table in the SQL database on the Analysis Server (BCP is a SQL Server-specific utility that copies date from a flat text file into a table or set of tables in the SQL Server database (505));

(5) calls the Import Program, which executes an SQL stored procedure which does following:

checks to see if there is a unique identifier in the reference tables for the data (506), and if there is no unique identifier, the program creates new entries in the reference tables (507), and then stores the unique identifier along with the rest of the log data in the Main Table (508); and empties the Temporary Table (509), thereby readying the database for the next import.

Upon completing all these steps for a particular web server's usage data, the Analysis Server Program performs the same steps for the next web server log file and continues until the data have been processed for each web server on the system.

Upon processing all the web server log files (510), the Analysis Server Program executes a stored procedure which generates summary tables from the Main Table. A Daily Summary Table is generated every day (511) and a Weekly Summary Table is generated if it is a Saturday (512 & 513). Finally, the Analysis Server Program deletes details in the Main Table that are over thirty days old (514). These time periods are illustrative, it being understood that time periods longer or shorter than provided in the foregoing may be utilized to meet the requirements of specific system applications.

Additional details regarding the installation of the tables, the data contained in the tables, and the stored procedures used by the system are set forth after the description of the below description of the Report-User Interface with the System.

Report-User Interface with the System

Figure 6:
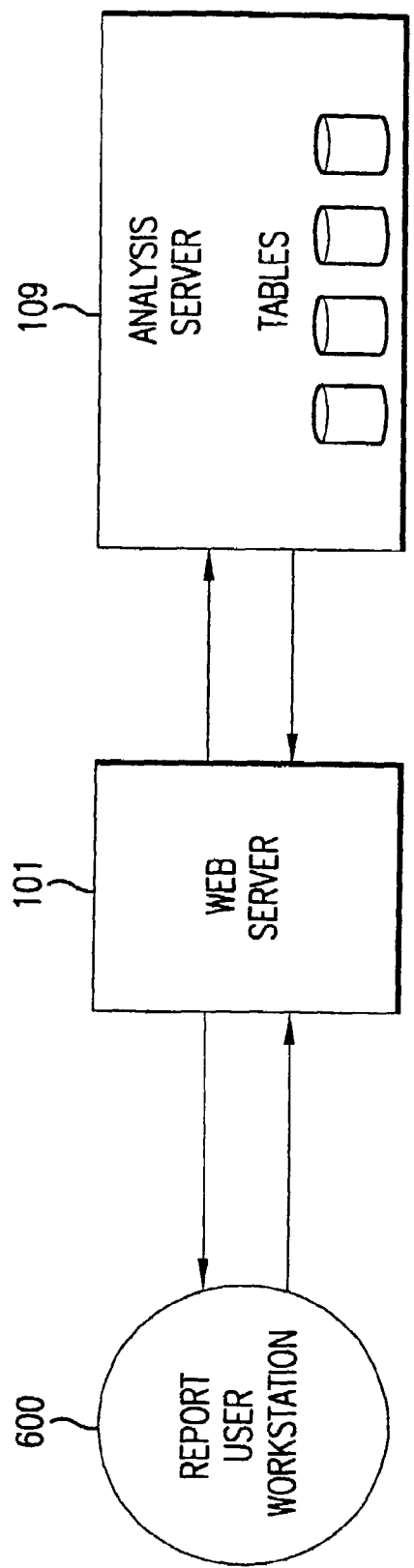
FIG. 6 is a block diagram showing the interface between the users of the system and the SQL database.

The interface between the user who uses the system to generate reports (the "Report-User") and the SQL database tables is depicted in FIG. 6. A Report-User accesses a web server (101) through a workstation (600) to obtain reports of data on the Analysis Server (109). A Report-User is distinguished from a System-User in that a Report-User has access to reports generated by the Analysis Server while a System-User can only execute the transactions available on the web site.

In the illustrative system described herein, a Report-User can obtain ten different reports, each of which permit certain user options. The reports are obtained directly from the Analysis Server.

In this illustrative system, the reports feature is implemented by using the Microsoft Internet Information Server (ISS) as the web server and Active Server Pages (ASP) to serve up content.

Although other software could be used, the illustrative system uses IIS because of its ability to support ASPS. The benefit of using Active Server Pages is their ability to quickly and efficiently interface with SQL databases. The illustrative example uses no non-standard configuration parameters of the Microsoft Internet Information Server software.

Using ASPS, Report-Users can specify the sets of System-Users they want to look at, the kind of information they want to see, and the date range for which they want to see this information. Access to queries is limited using security features provided by IIS such as password protection.

The user can use Microsoft IE or Netscape to run the available reports on the data from the SQL database on the Analysis Server. In addition, the system uses Software FX, Inc.'s Chart FX IE to produce graphical charts on the Web Report pages. Chart FX IE Server Side Component is utilized to produce either JPG or PNG image files on the web servers' hard drive each time a Report-User accesses one of the report pages. When the page is returned to the browser (in HTML format)—an "A HREF" tag is used to display the appropriate graph.

User Controlled Web Pages

Figure 7:
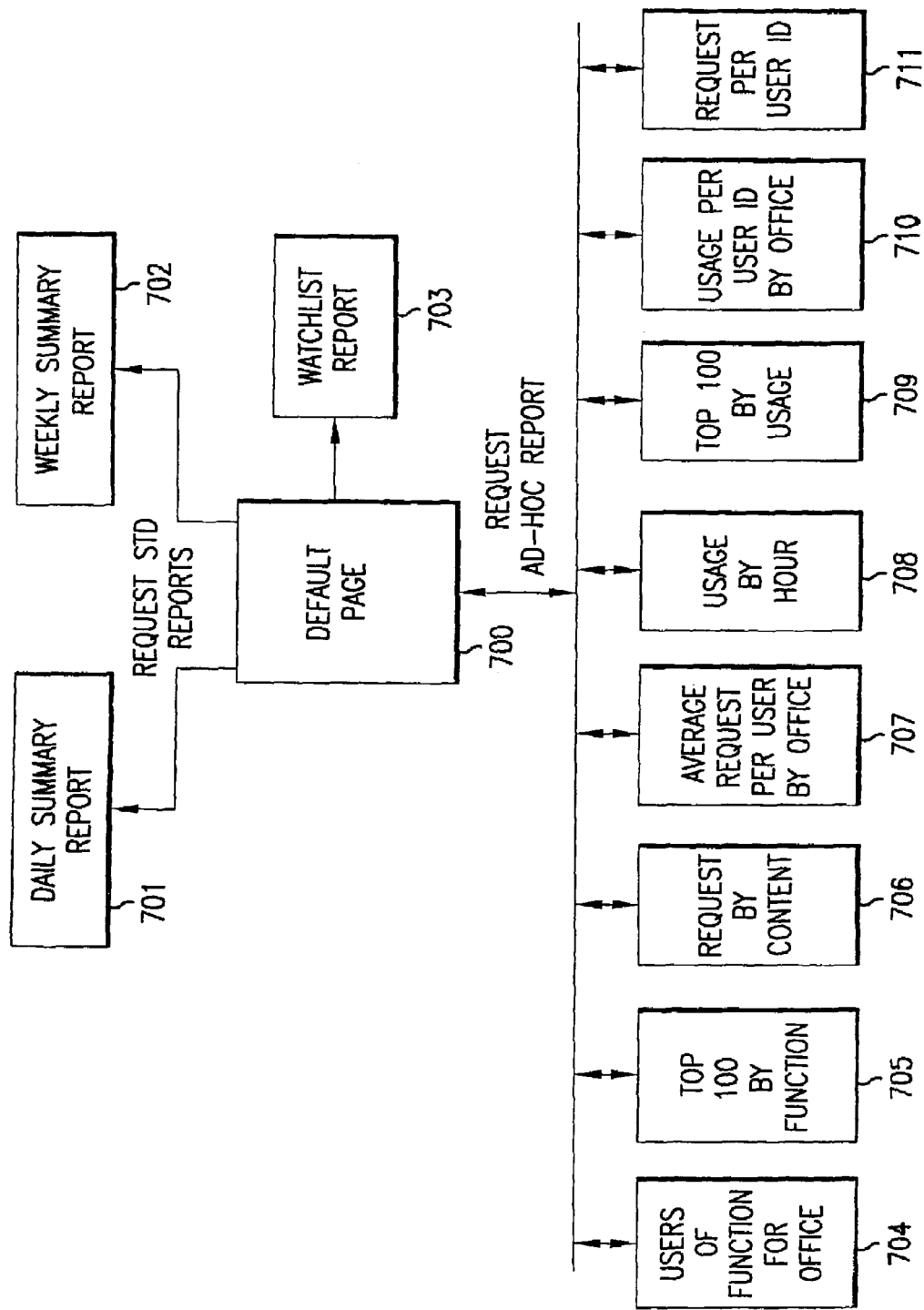
FIG. 7 shows the various web pages a user can access and the interrelationship between the pages.
Figure 9B:
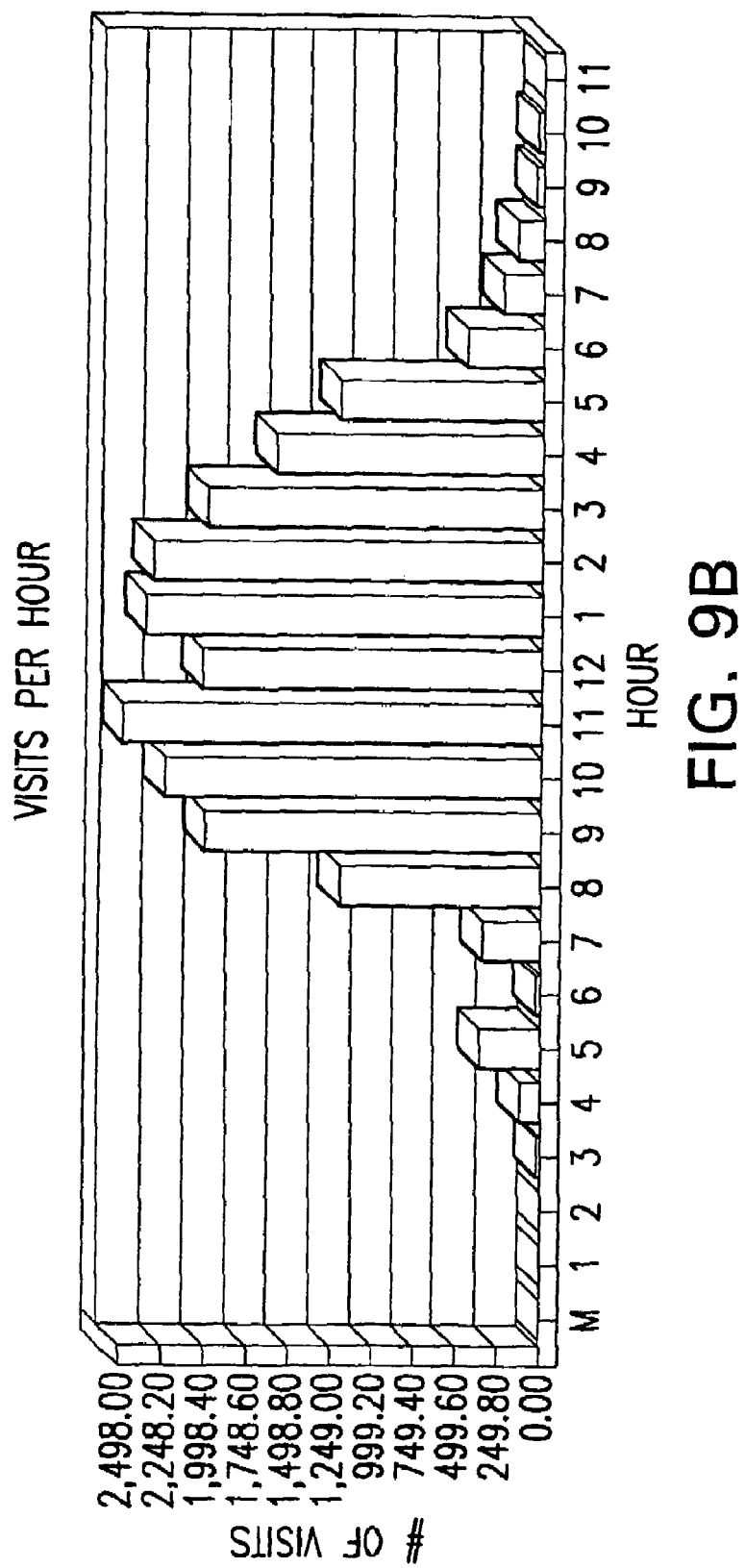
FIG. 9 depicts an illustrative copy of the Daily Summary Report.
Figure 9D:
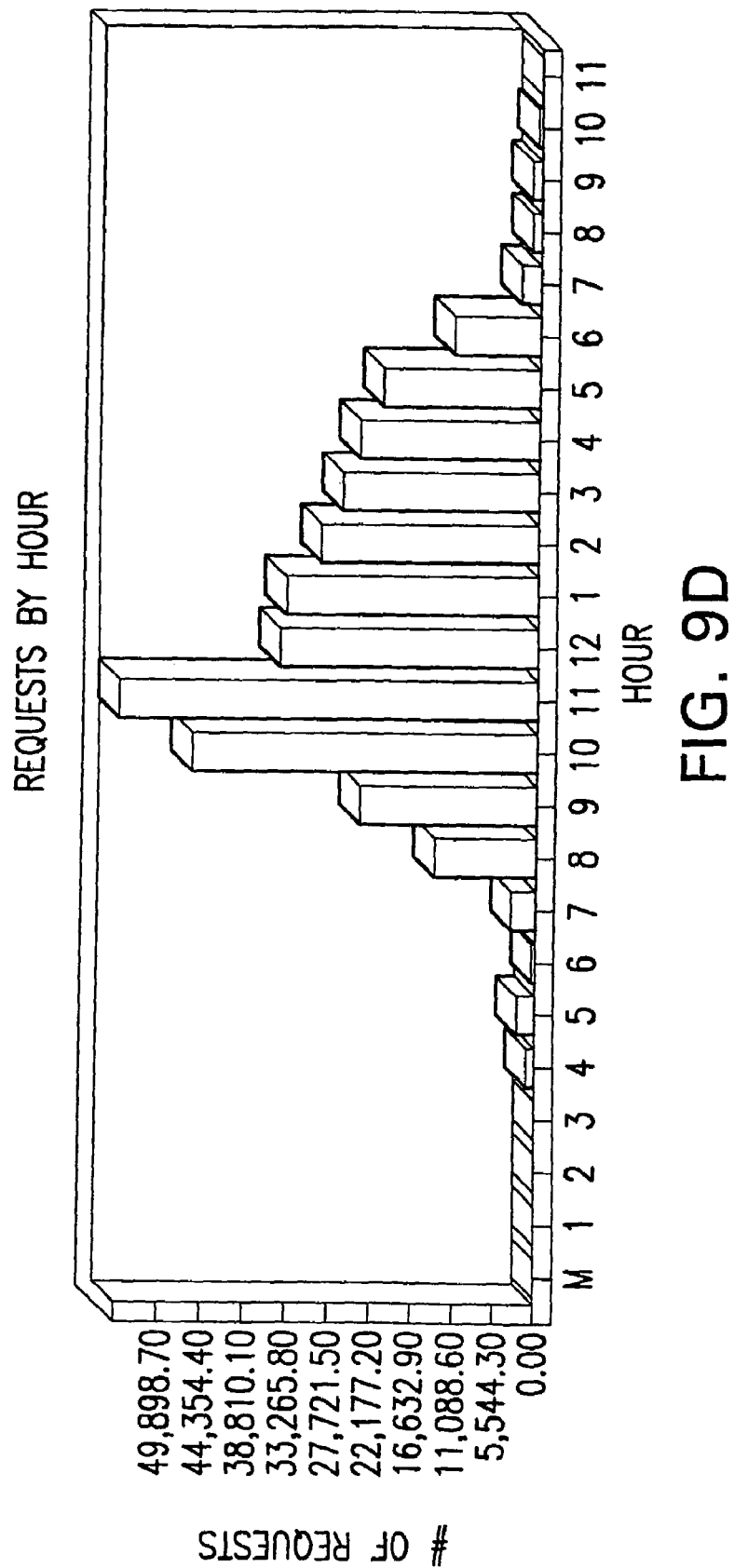
Figure 9F:
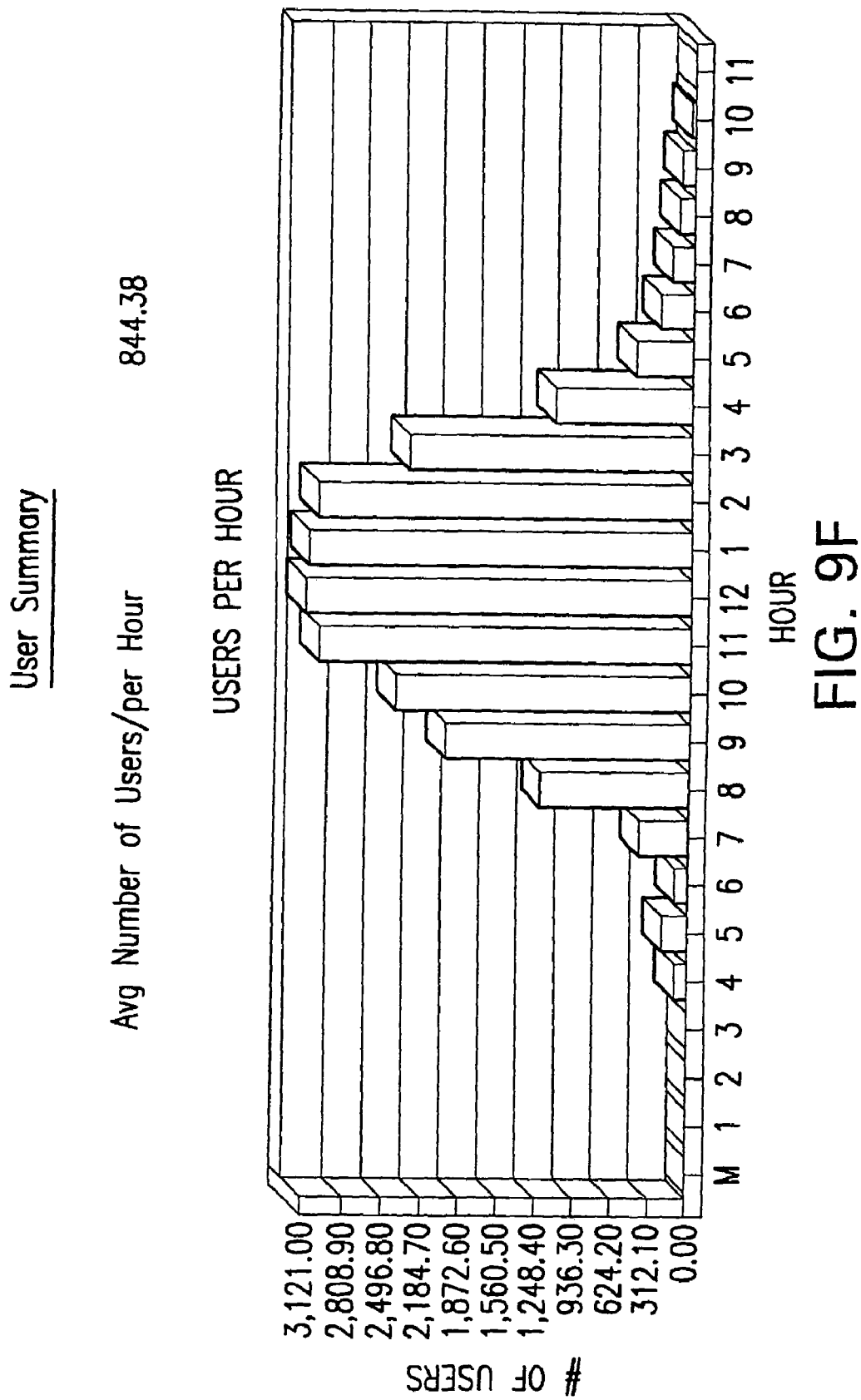
Figure 9H:
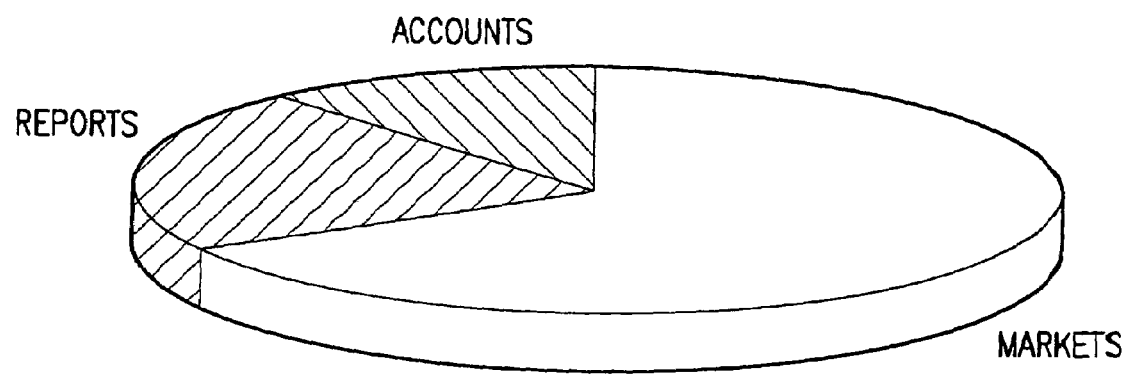
Figure 9J:
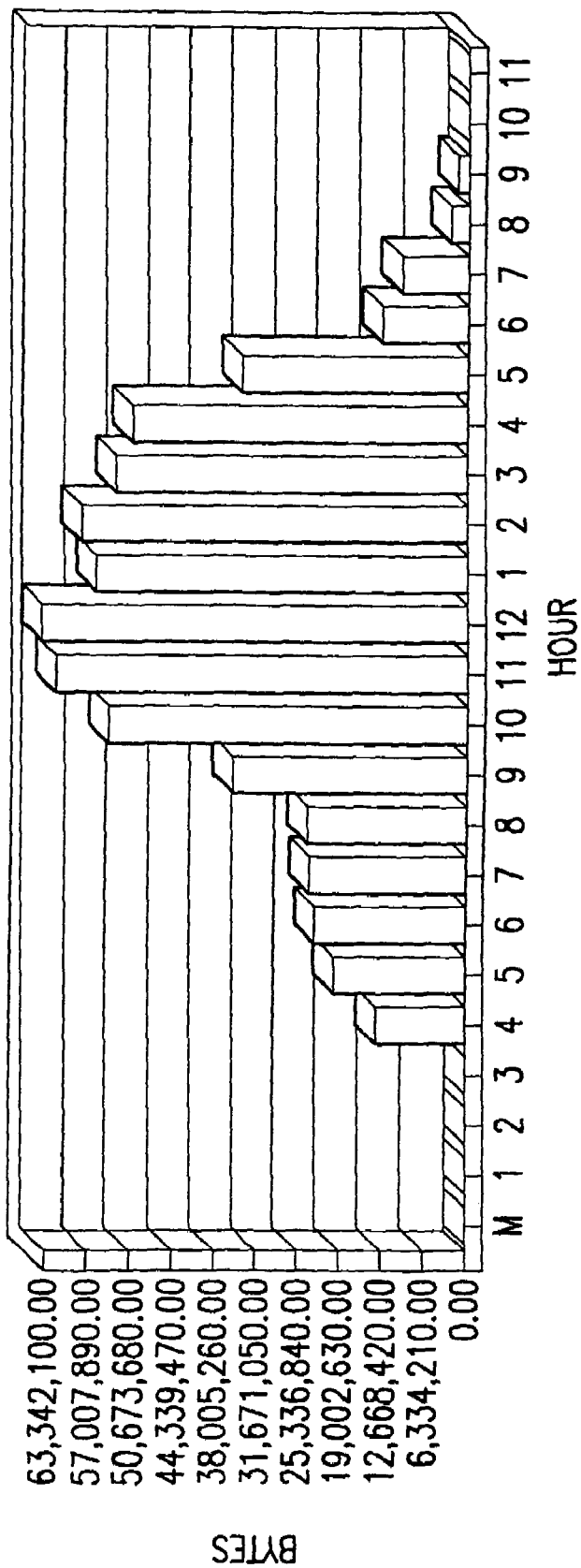
Figure 10B:
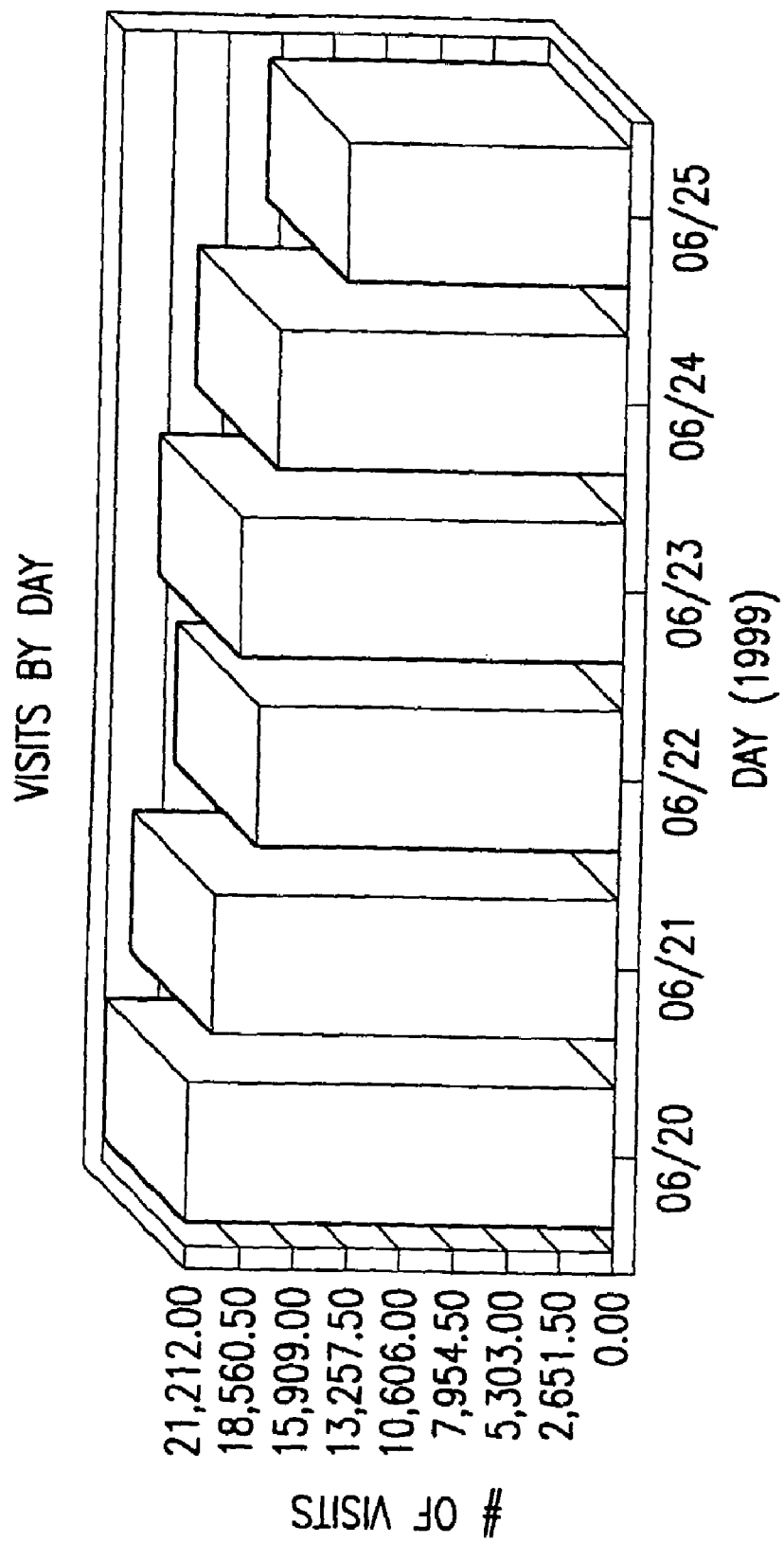
FIG. 10 depicts an illustrative copy of the Weekly Summary Report
Figure 10D:
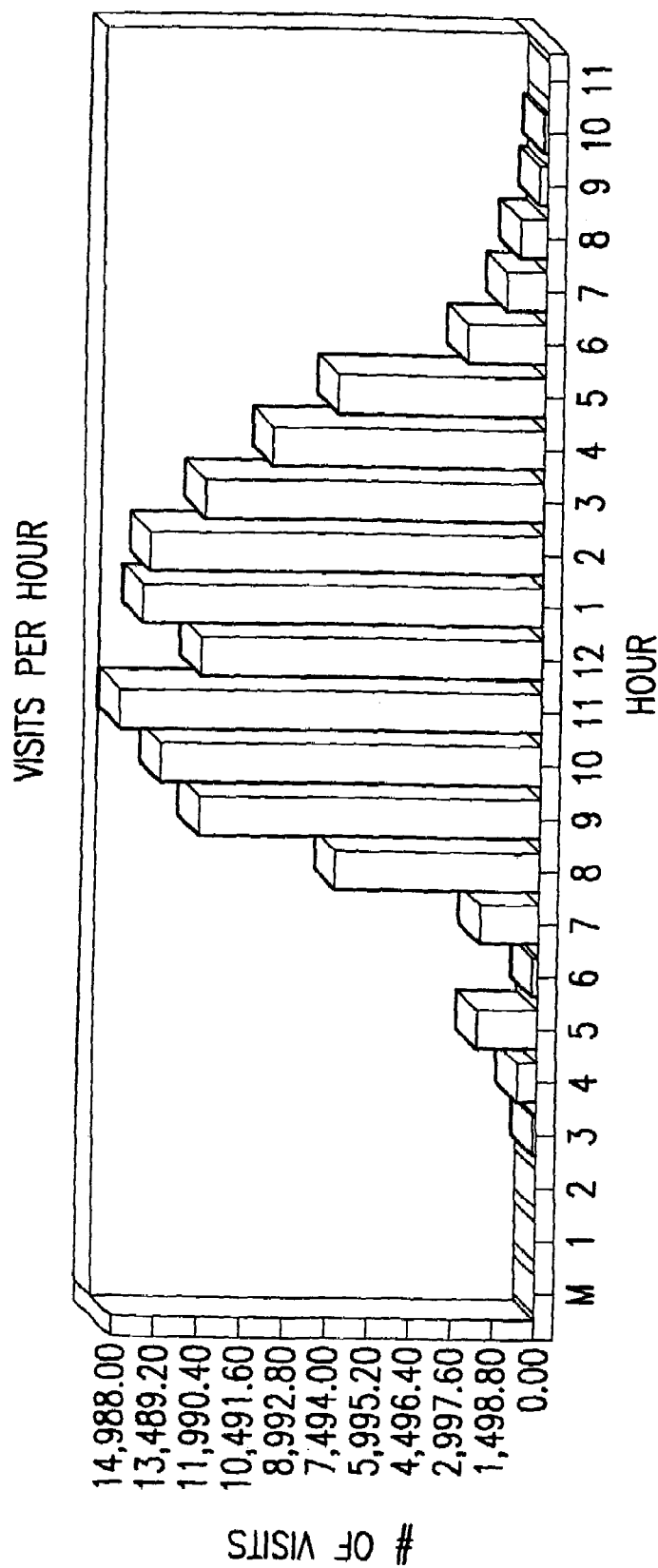
Figure 10F:
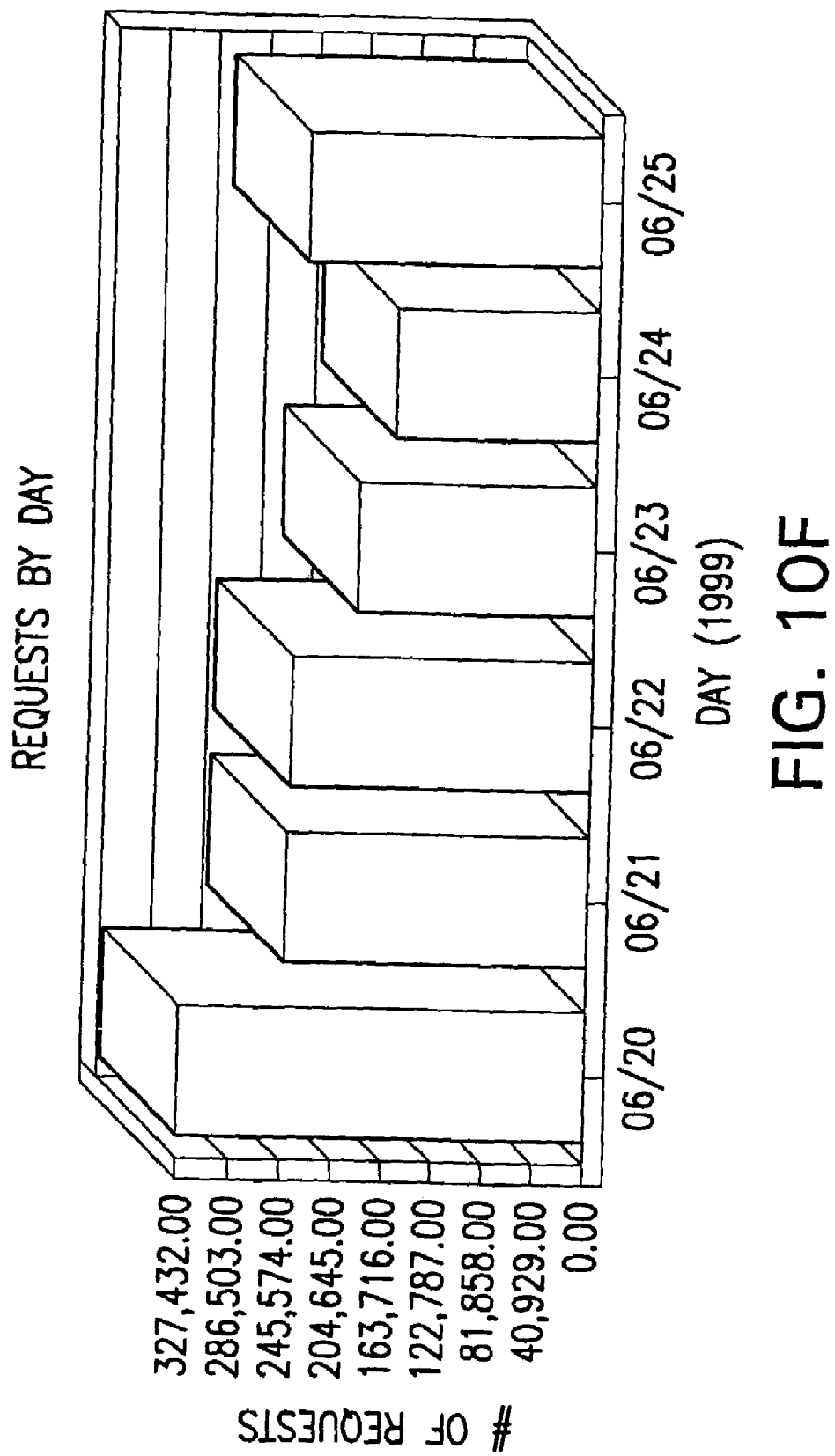
Figure 10H:
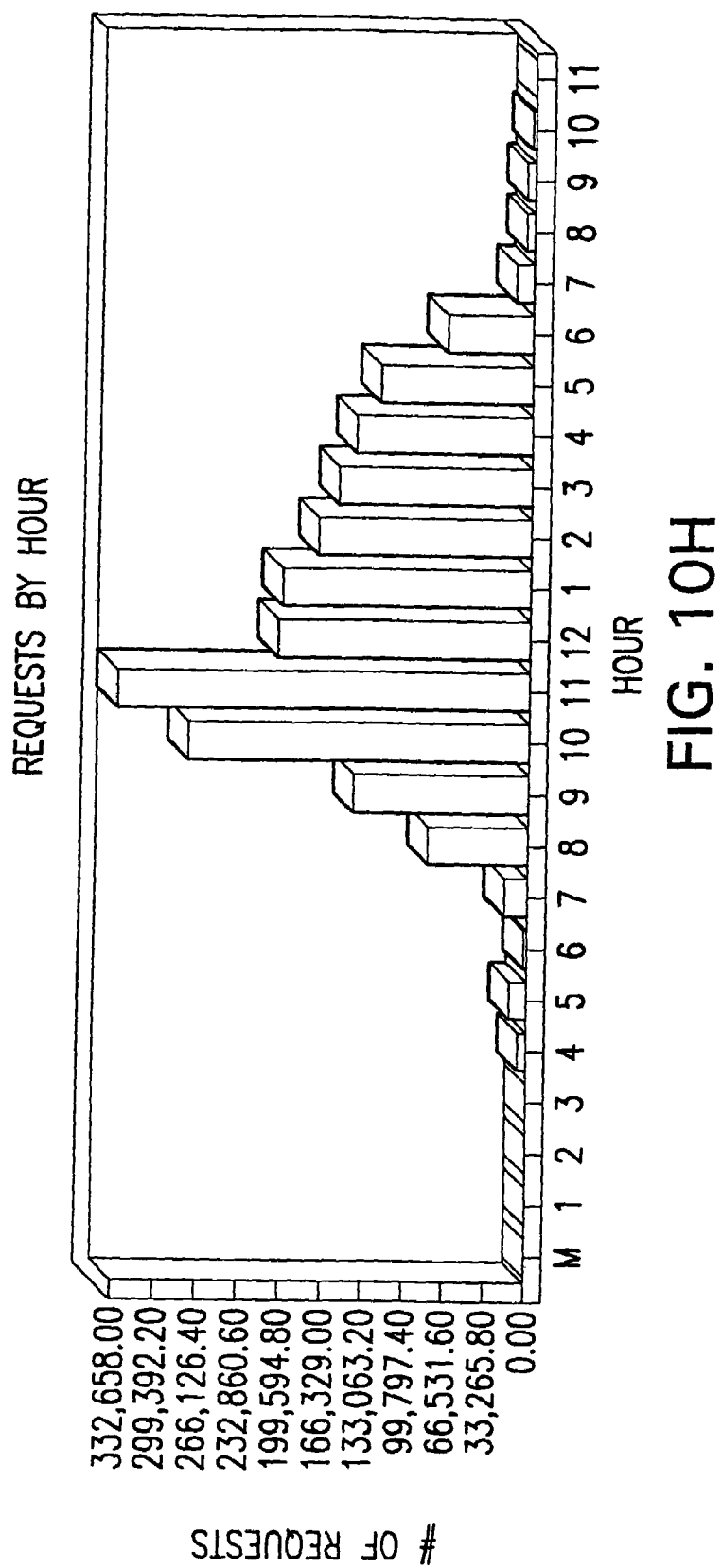
Figure 10J:
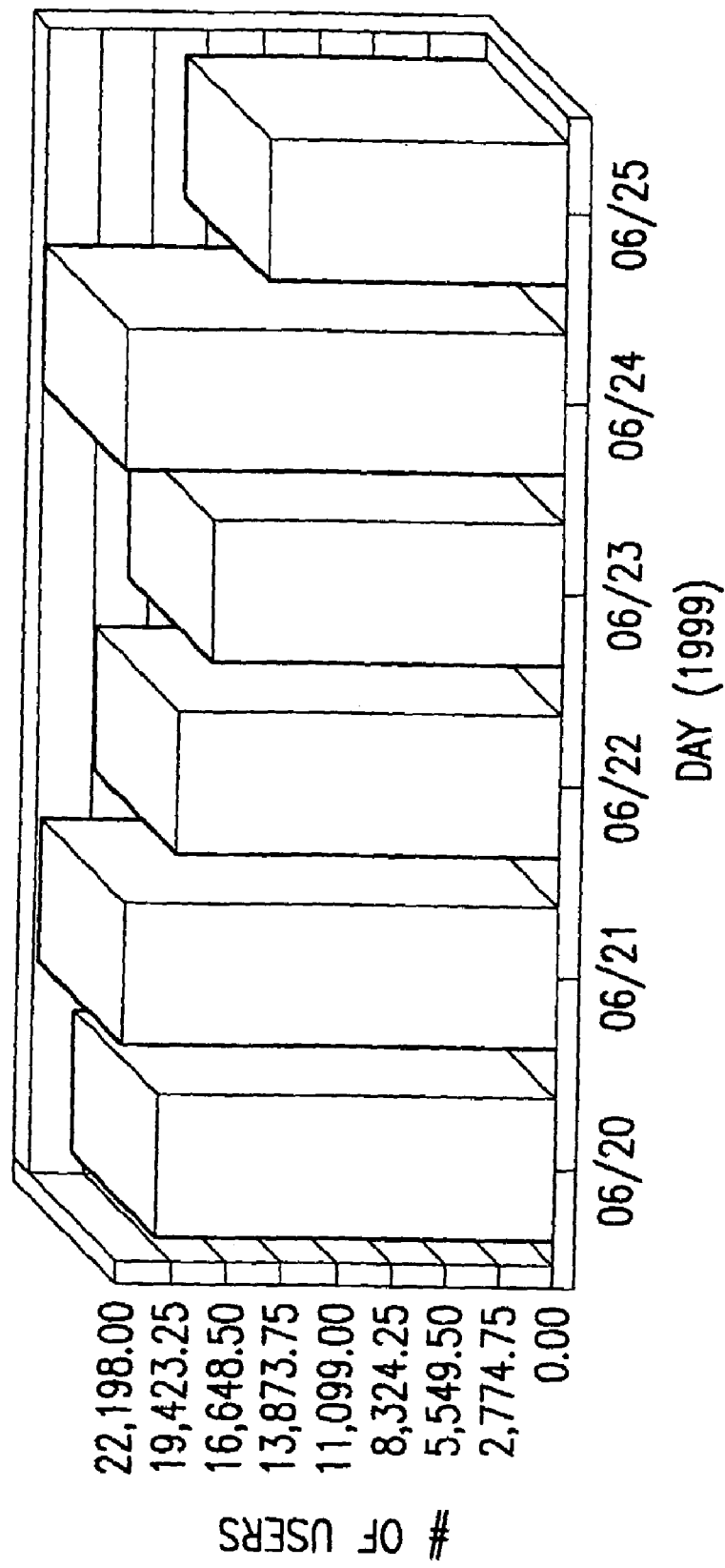
Figure 10L:
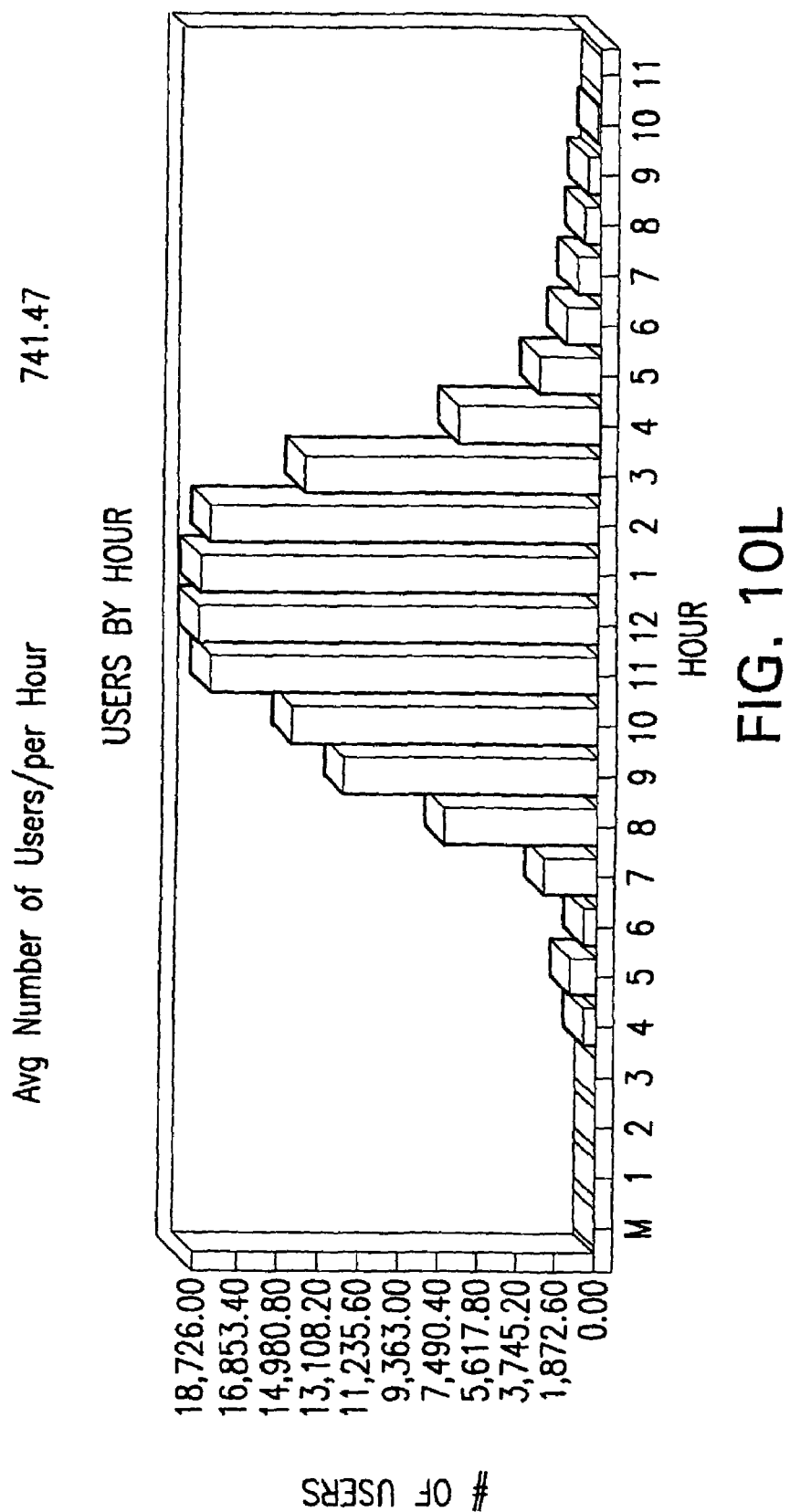
Figure 10N:
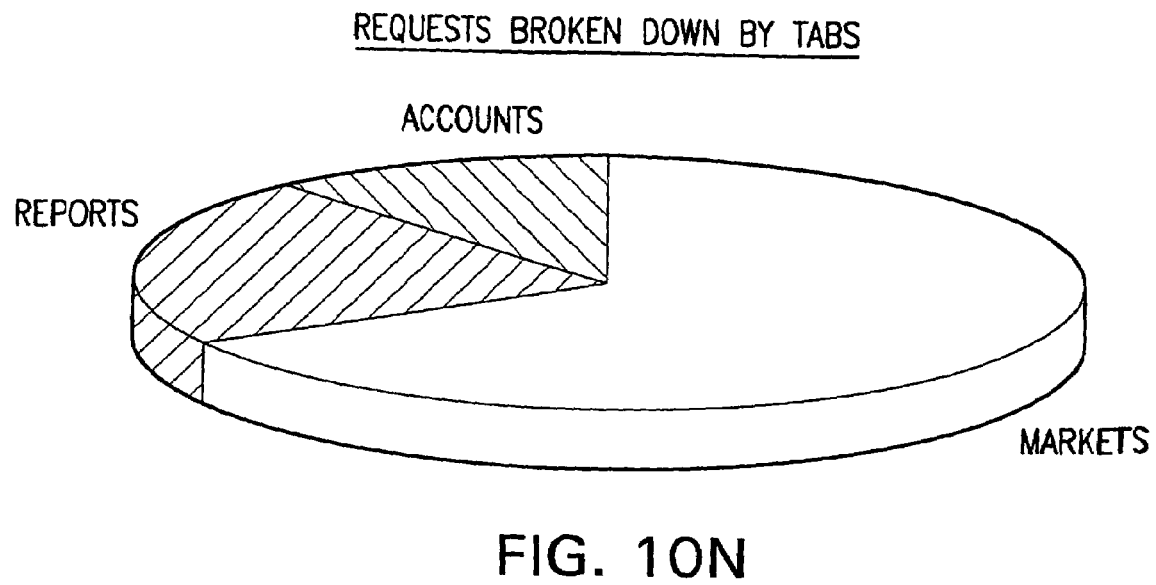
Figure 10P:
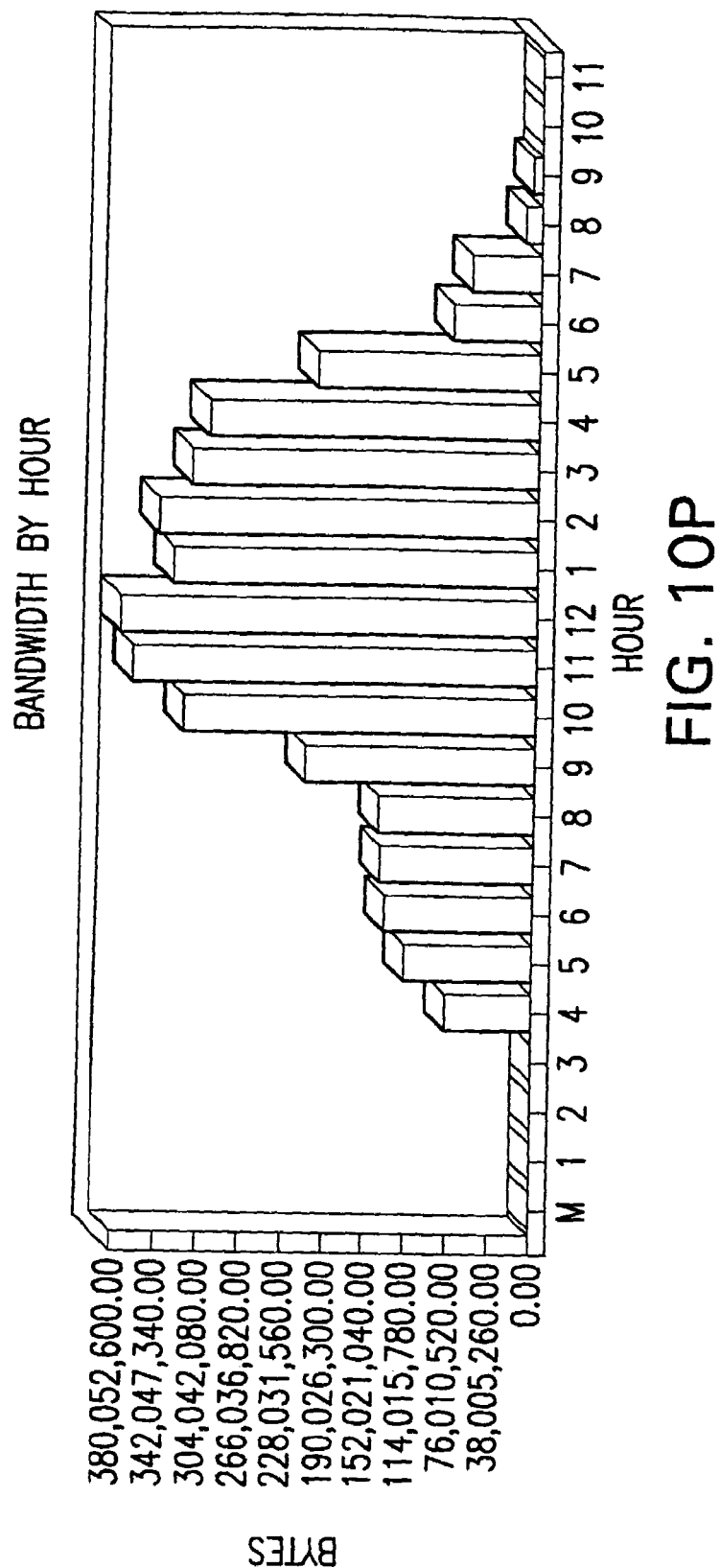

The various web pages a Report-User can access and the interrelationship between the pages is depicted in FIG. 7. When a Report-User starts the web application, the Default Screen (700), on illustratiave copy of which is depicted in FIG. 8, is returned. From the Default Screen, the Report-User can select one of the two standard reports or to run one of the eight other reports. A description follows of each of the reports:

The Daily Summary Report (701)

An illustrative copy of the Daily Summary Report is depicted in FIG. 9. The system-user selects the Daily Summary Report by clicking the report on the Default Screen. The daily summary report is populated with the 30 most recent dates from the Daily Summary Table. The Daily Report is generated using two stored procedures: Do the Table Stored Procedure and Do the Function Table stored procedure.

The Weekly Summary Report 702)

An illustrative copy of the Weekly Summary Report is depicted in FIG. 10. The Report-User selects the desired 7-day Sat-Fri week for the report. The Make Weekly Report uses three stored procedures to generate the report: Do the Table Stored Procedure, Do the Day Table Procedure, and Do the Weekly Function Table Procedure.

Request by Content Report (706)

An illustrative copy of the Request by Content Report is depicted in FIG. 11. The report is used to display information for various "Functions" and numbers of requests for a specified date range. To run the report, the System-User enters the date range on the Default Screen and clicks on the report. The stored procedure Get Multi-day Function Summary is called to return the data needed for the report.

Average Request Per User by Office Report (707)

The Average Request Per User by Office Report is used to show the average requests from each office. An illustrative copy of the report is depicted at FIG. 12. Also shown on the report is the total number of requests for that date range and how many users made the requests. The Report-User inputs the date range and selects the report from the Default Screen. A hyperlink on the report brings the Report-User to the Usage Per User For Office Report, showing them the usage broken down for each user making requests in that office for the given date range. The results shown can be sorted by any of the columns in ascending or descending order. The stored procedure Get Every Request by User per Office is called to return the data needed for the report.

Usage by Hour Report (708)

The Usage by Hour Report displays the average usage by hour for the date range requested. An illustrative copy of the report is depicted at FIG. 13. The time shown on the graph is from midnight to 11 pm. The System-User inputs the date range and selects the report from the Default Screen. The stored procedure Get Request by Hour is called to return the data needed for the report.

Top 100 By Usage (709)

The Top 100 by Usage Report displays the top 100 User IDs for the given date range, how many requests they made, what office they are from, and who they are. An illustrative copy of the page is depicted at FIG. 14. Hyperlinks expand the report to obtain information on the requests of a particular User ID (Link Calls Request for User ID Report) and to obtain break down of an office's; total request by User ID (Link Calls Usage Per User ID for Office Report). The System-User inputs the date range and selects the report from the Default Screen. The results shown can be sorted by any of the columns in ascending or descending order. The stored procedure Get Usage by User ID is called to return the data needed for the report.

Usage per User ID by Office Report (710)

The Usage per User ID by Office Report displays all User IDs in a particular office, their name, and how many requests they made during the date range specified. An illustrative copy of the page is depicted at FIG. 15. Hyperlinks expand the report by providing a link to the Request for User II) Report. This link will show a detailed breakdown of each request made by the User ID. The System-User inputs the date range and selects the report from the Default Screen. The results can be sorted by any of the columns in ascending or descending order. The stored procedure Get Request by User for Office is called to return the data needed for the report.

Requests Per User ID Report (711)

The Request Per User ID Report page displays the requests associated with a given User ID. An illustrative copy of the report is depicted at FIG. 16. Also displayed on this report are the Office Name, Office Number, and User Name. The System-User inputs the date range and selects the report from the Default Screen. The stored procedure Get Requests for User ID is called to generated the data needed for this report.

Users of Function for an Office Report (704)

The Users of Function for an Office Report displays the users of a function for a particular office and the number of times the function was used. An illustrative copy of the report is depicted at FIG. 17. The System-User inputs the function, the office, and the date range. The report is selected from the Default Screen. The stored procedure Get Users by Function Usage for Office is called to generate the data needed for this report.

Top 100 for a Function Report (705)

The Top 100 for a Function Report displays the top 100 users of a specified function. An illustrative copy of the report is depicted at FIG. 18. The System-User inputs the Function and the date range. The report is selected from the Default Screen. The stored procedure Get Top User by Function is called to generate the data needed for this report.

Figure 19:
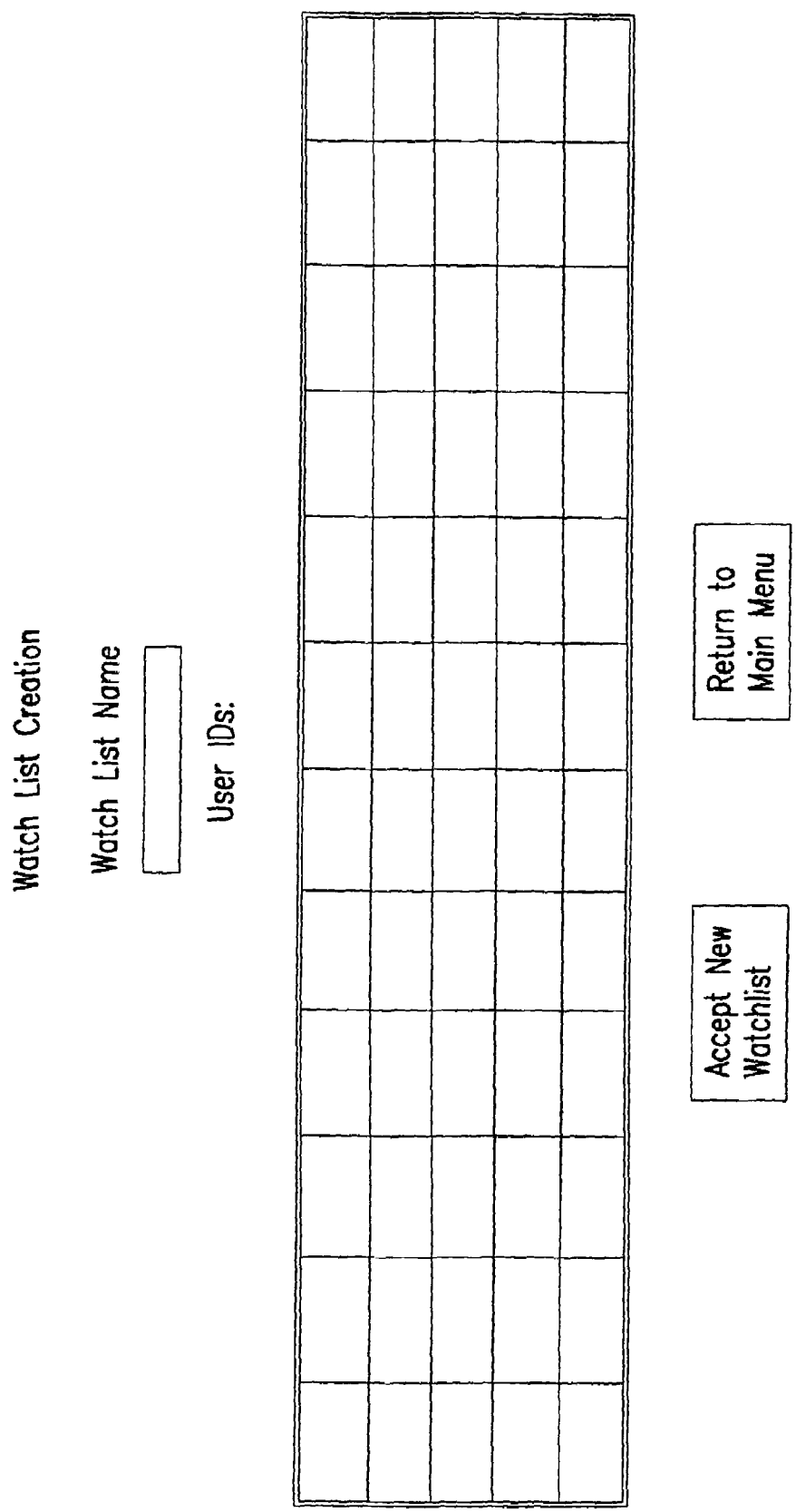
FIG. 19 depicts an illustrative copy of the Watch List Report

In addition to the above reports, the system also allows the report-user to create a watch list report of User IDs. An illustrative copy of a watch list screen is depicted in FIG. 19. These watch lists are then run against a report that will return information on a collection of User IDs. In the illustrative system, the actual watch lists are maintained entirely on the Report-User's desktop with the use of cookies. A Report-User can enter up to 50 User IDs through the "Add WatchList" button on the Default Screen.

Figure 20:
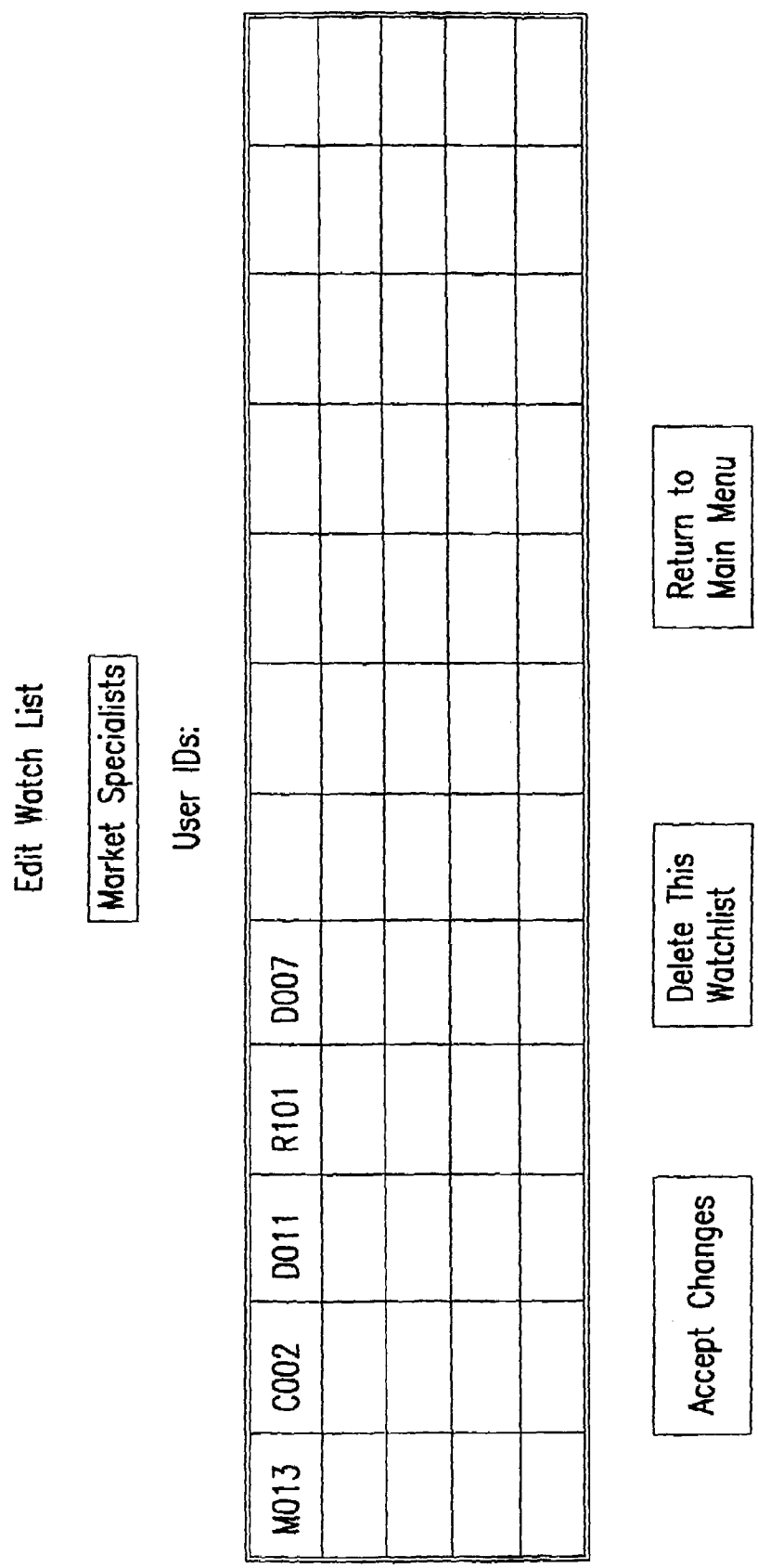
FIG. 20 depicts an illustrative copy of the Edit Watch List Screen

If a Report-User clicks on the "Edit Watchlist" link, the Report-User is taken to a similar screen to the "New Watch Screen" entry screen. An illustrative copy of the "Edit Watch List" screen is depicted at FIG. 20. The variables are filled with the currently chosen Watchlist information, and the System-User can change any of this information. Buttons are provided to Accept New Changes, Delete the Watch List, and Return to the Default Screen.

Process for Installing the SQL database on the Analysis Server

Installing the SQL database on the Analysis Server consists of three database scripts which must be run in the following order: (1) Create Tables Script, (2) Create Views Script, and (3) Stored Procedures Script.

The Create Tables Script creates all the database tables and their indexes.

The Create Views Script creates views based on some of the tables just created.

The Create Stored Procedure Script creates all the stored procedures needed to get data from the tables, to add data to, or delete data from, the tables created.

The Tables in the SQL Database

Figure 21:
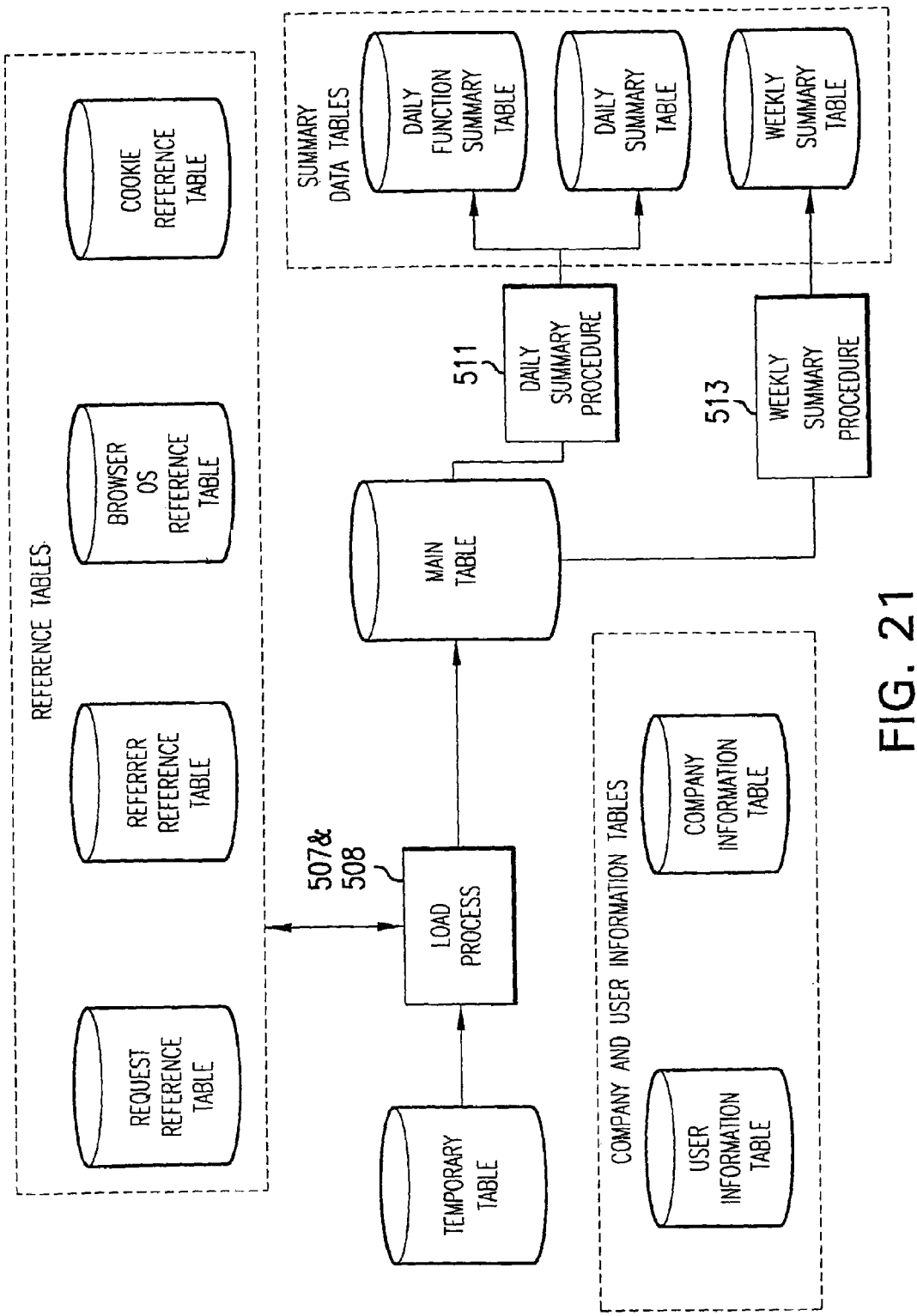
FIG. 21 shows the tables of the database and the way in which data is processed between the tables.

The Analysis Server's SQL database tables and the way in which the data is processed between the tables is depicted in FIG. 21. The Main Table and Reference Tables are loaded through previously described steps 507 & 508. Summary tables are generated by previously described steps 511 & 513. The SQL database in the illustrative system consists of 11 tables. The tables are:

1. The Temporary Table

The Temporary Table holds the data imported directly from the filtered Web Server Logs. It contains one row for each request made by a System-User. It is populated by the BCP utility, which imports data from the filtered Web Server Logs. The Temporary Table is emptied after the Import Program loads the Main Table and updates the Reference Tables.

The fields of the Temporary Table are as follows:

| | | |
|---|---|---|
| ip_address | varchar (15) | The IP Address of the user |
| req_date | int | The date of the request in for not yyyymmdd |
| req_timestamp | datetime | The date/Timestamp of the Request |
| diff_from_greenwich_time | char (10) | Diff from Greenwich time |
| req_type_id | char (1) | Whether the request was a GET or POST |
| the_request | varchar (255) | The actual request text that occurs in log file |
| req_parameters | varchar (255) | Up to 255 characters of actual parameter string |
| req_code | varchar (5) | The Return Code from Web Server |
| req_len | varchar (7) | #Bytes returned by the Web Server |
| the_referrer | varchar (255) | The actual referrer text that occurs in log file |
| the_browser os | varchar (80) | The actual Browser/OS text that occurs in log file |
| the_cookie | varchar (50) | The actual cookie text that occurs in log file |

2. The Main Table

The Main Table contains one row for each request made by a System-User and is populated by the Import Program. Some of the fields in the Main Table contain only unique identifiers. The actual values are contained in various reference tables. Using unique identifiers saves space in the database, and allows the storage of more data in the same space.

The fields of the Main Table are as follows:

| | | |
|---|---|---|
| i_address | char (25) | The IP Address of the User |
| req_date | int | The date of the request in for not yyyymmdd |
| req_timestamp | Datetime | The date/Timestamp of the Request |
| diff_from_greenwich_time | char (10) | Diff from Greenwich time |
| req_type_id | char (1) | Whether the request was a GET or POST (e.g. "G" is Get) |
| request_id | int | The unique identifier of the request; The actual text is stored in the Request Reference Table |
| req_parameters | varchar (50) | Up to 50 characters of the actual parameter string |
| req_code | char (5) | The Return Code from Web Server |
| req_len | char (7) | #Bytes returned by the Web Server |
| referrer_id | int | The unique identifier of the Web Browser/Operating System User was using; The actual text is in the Browser OS Reference Table |
| cookie_id | int | The unique identifier of the UserID of the User; The actual User ID is stored in the Cookie Reference Table |
| user_code | varchar (4) | Contains the user type |

3. Request Reference Tables

The Request Reference Table contains one row for each possible request that can be made by a System-User and is populated by the Import Program.

The fields of the Request Reference Table are as follows:

| | | |
|---|---|---|
| request_text | varchar (255) | The actual request text that occurs in the log file (e.g: "/login/accounts/xxx.proc") |
| request_id | int | The unique identifier of each request text. This unique identifier occurs in the Main Table |

4. Referrer Reference Table

The Referrer Reference Table contains one row for each referrer in the Web Server Logs, and is populated by the Import Program. A referrer is the System-User's prior location.

The fields of the Referrer Table are as follows:

| | | |
|---|---|---|
| referrer_text | varchar (255) | The actual referrer text that occurs in the log file (e.g: "/login/accounts/xxx.proc") |
| referrer_id | int | The unique unique identifier of each referrer text. This unique identifier occurs in the main_table |

5. Browser OS Reference Table

The Browser OS Reference Table contains one row for each possible Browser/OS combination used by a System-User and is populated by the Import Program.

The fields of the Browser OS Reference Table are as follows:

| | | |
|---|---|---|
| referrer_text | varchar (255) | The actual referrer text that occurs in the log file (eg: "/login/accounts/xxx.proc") |
| referrer_id | int | The unique unique identifier of each referrer text. This unique identifier occurs in the main_table |

6. Cookie Reference Table

The Cookie Reference Table contains one row for each possible Cookie that has been captured in the Web Server Logs and is populated by the Import Program. It contains the Cookie text and the Cookie unique identifier. The Cookie contains the User ID which enables the system to link the USER ID to USER ID data in other databases.

The fields of the Cookie Reference Table are as follows:

| | | |
|---|---|---|
| cookie_text | varchar (50) | The actual Cookie text that occurs in the log file |
| cookie_id | int | The unique unique identifier of each referrer text. The Unique identifier of each cookie text. This Unique identifier occurs in the main_table |

7. Daily Summary Table

The Daily Summary Table contains daily information summarized from the Main Table. It contains one row for each day. It is populated by the Daily Summary Table Procedure Table that runs immediately alter the Import of the data from the Web Server Logs into the Main Table.

The fields of the Daily Summary Table are as follows.

| | | |
|---|---|---|
| the_date | datetime | The Date; Key Field |
| total_requests | integer | Total Requests for day |
| requests_for_hour | integer | Total Requests between 12:00 and 1:00 AM |
| requests_for_hour | integer | Total Requests between 1:00 and 2:00 AM |
| requests_for_hour | integer | Total Requests between 2:00 and 3:00 AM |
| requests_for_hour | integer | Total Requests between 3:00 and 4:00 AM |
| requests_for_hour | integer | Total Requests between 4:00 and 5:00 AM |
| requests_for_hour | integer | Total Requests between 5:00 and 6:00 AM |
| requests_for_hour | integer | Total Requests between 6:00 and 7:00 AM |
| requests-for-hour | integer | Total Requests between 7:00 and 8:00 AM |
| requests_for_hour | integer | Total Requests between 8:00 and 9:00 AM |
| requests_for_hour10 | integer | Total Requests between 9:00 and 10:00 AM |
| requests_for_hour11 | integer | Total Requests between 10:00 and 11:00 AM |
| requests_for_hour12 | integer | Total Requests between 11:00 and 12:00 AM |
| requests_for_hour13 | integer | Total Requests between 12:00 and 1:00 AM |
| requests_for_hour14 | integer | Total Requests between 1:00 and 2:00 AM |
| requests_for_hour15 | integer | Total Requests between 2:00 and 3:00 AM |
| requests_for_hour16 | integer | Total Requests between 3:00 and 4:00 AM |
| requests_for_hour17 | integer | Total Requests between 4:00 and 5:00 AM |
| requests_for_hour18 | integer | Total Requests between 5:00 and 6:00 AM |
| requests_for_hour19 | integer | Total Requests between 6:00 and 7:00 AM |
| requests_for_hour20 | integer | Total Requests between 7:00 and 8:00 AM |
| requests_for_hour21 | integer | Total Requests between 8:00 and 9:00 AM |
| requests_for_hour22 | integer | Total Requests between 9:00 and 10:00 AM |
| requests_for_hour23 | integer | Total Requests between 10:00 and 11:00 AM |
| request_for_hour24 | integer | Total Requests between 11:00 and 12:00 AM |
| total_visits | integer | Total Visits for Day |
| visit_duration | float | Average Length of Visit for Day |
| visit_for_hour | integer | Total Visits between 12:00 and 1:00 AM |
| visit_for_hour | integer | Total Visits between 1:00 and 2:00 AM |
| visit_for_hour | integer | Total Visits between 2:00 and 3:00 AM |
| visit_for_hour | integer | Total Visits between 3:00 and 4:00 AM |
| visit_for_hour | integer | Total Visits between 4:00 and 5:00 AM |
| visit_for_hour | integer | Total Visits between 5:00 and 6:00 AM |
| visit_for_hour | integer | Total Visits between 6:00 and 7:00 AM |
| visit_for_hour | integer | Total Visits between 7:00 and 8:00 AM |
| visit_for_hour | integer | Total Visits between 8:00 and 9:00 AM |
| visit_for_hour10 | integer | Total Visits between 9:00 and 10:00 AM |

-continued

| | | |
|---|---|---|
| visit_for_hour11 | integer | Total Visits between 10:00 and 11:00 AM |
| visit_for_hour12 | integer | Total Visits between 11:00 and 12:00 AM |
| visit_for_hour13 | integer | Total Visits between 12:00 and 1:00 PM |
| visit_for_hour14 | integer | Total Visits between 1:00 and 2:00 PM |
| visit_-for_hour15 | integer | Total Visits between 2:00 and 3:00 PM |
| visit_for_hour16 | integer | Total Visits between 3:00 and 4:00 PM |
| visit_for_hour17 | integer | Total Visits between 4:00 and 5:00 PM |
| visit_for_hour18 | integer | Total Visits between 5:00 and 6:00 PM |
| visit_for_hour19 | integer | Total Visits between 6:00 and 7:00 PM |
| visit_for_hour20 | integer | Total Visits between 7:00 and 8:00 PM |
| visit_for_hour21 | integer | Total Visits between 8:00 and 9:00 PM |
| visit_for_hour22 | integer | Total Visits between 9:00 and 10:00 PM |
| visit_for_hour23 | integer | Total Visits between 10:00 and 11:00 PM |
| visit_for_hour24 | integer | Total Visits between 11:00 and 12:00 AM |
| total_users | integer | Total Users for the Day |
| users_for_hour_integer | | Total Users between 12:00 and 1:00 AM |
| users_for_hour_integer | | Total Users between 1:00 and 2:00 AM |
| users_for_hour_integer | | Total Users between 2:00 and 3:00 AM |
| users_for_hour_integer | | Total Users between 3:00 and 4:00 AM |
| users_for_hour_integer | | Total Users between 4:00 and 5:00 AM |
| users_for_hour_integer | | Total Users between 5:00 and 6:00 AM |
| users_for_hour_integer | | Total Users between 6:00 and 7:00 AM |
| users_for_hour_integer | | Total Users between 7:00 and 8:00 AM |
| users_for_hour_integer | | Total Users between 8:00 and 9:00 AM |
| users_for_hour 10 | integer | Total Users between 9:00 and 10:00 AM |
| users_for_hour 11 | integer | Total Users between 10:00 and 11:00 AM |
| users_for_hour 12 | integer | Total Users between 11:00 and 12:00 PM |
| users_for_hour 13 | integer | Total Users between 12:00 and 1:00 PM |
| users_for_hour 14 | integer | Total Users between 1:00 and 2:00 PM |
| users_for_hour 15 | integer | Total Users between 2:00 and 3:00 PM |
| users_for_hour 16 | integer | Total Users between 3:00 and 4:00 PM |
| users_for_hour 17 | integer | Total Users between 4:00 and 5:00 PM |
| users_for_hour 18 | integer | Total Users between 5:00 and 6:00 PM |
| users_for_hour 19 | integer | Total Users between 6:00 and 7:00 PM |
| users_for_hour 20 | integer | Total Users between 7:00 and 9:00 PM |
| users_for_hour 21 | integer | Total Users between 8:00 and 9:00 PM |
| users_for_hour 22 | integer | Total Users between 9:00 and 10:00 PM |
| users_for_hour 23 | integer | Total Users between 10:00 and 11:00 PM |
| users_for_hour 24 | integer | Total Users between 11:00 and 12:00 PM |
| total_bandwidth | integer | Total bandwidth used for the Day |
| bandwidth_for_hour | integer | Total bandwidth between :00 and:00 M |
| bandwidth_for_hour | integer | |
| bandwidth_for_hour | integer | |
| bandwidth_for_hour | integer | |
| bandwidth_for_hour | integer | |
| bandwidth_for_hour | integer | |
| bandwidth_for_hour | integer | |
| bandwidth_for_hour | integer | |
| bandwidth_for_hour | integer | |
| bandwidth_for_hour10 | integer | |
| bandwidth_for_hour11 | integer | |
| bandwidth_for_hour12 | integer | |
| bandwidth_for_hour13 | integer | |
| bandwidth_for_hour14 | integer | |
| bandwidth_for_hour15 | integer | |
| bandwidth_for_hour16 | integer | |
| bandwidth_for_hour17 | integer | |
| bandwidth_for_hour18 | integer | |
| bandwidth_for_hour19 | integer | |
| bandwidth_for_hour20 | integer | |
| bandwidth_for_hour21 | integer | |
| bandwidth_for_hour22 | integer | |
| bandwidth_for_hour23 | integer | |
| bandwidth_for_hour24 | integer | |

8. Daily Function Summary Table

The Daily Function Summary Table contains a summary of the information about each tab, and how many times each subsection of the function was accessed each day. There are multiple rows for each, unlike the Daily Summary Table, but only one row for each section of each tab for each day.

The fields of the Daily Function Summary Table are as follows:

| | | |
|---|---|---|
| the_date | datetime | The date of the requests |
| report_id | small int | Report identifier |
| tab_id | small int | Function identifier |
| which_tab | char (15) | The name of the function |
| content | varchar (255) | The actual content requested |
| num_requests | integer | Number of requests made on this date to this content |

9. Weekly Summary Table

The Weekly Summary Table holds only the Unique User count for each Saturday-Friday week. Every other kind of weekly summary information can be obtained by doing a query on the Daily Summary Table.

The fields of the Weekly Summary Table are as follows:

| | | |
|---|---|---|
| start_of_week | datetime | The date on Saturday |
| end_of_week | datetime | The date on the following Friday; These 2 fields define the week |
| report_id | small int | Report identifier |
| num_users | int | Number of unique users that visited the entire site |

10. Company Information Table

The Company Information Table contains company specific information needed to run certain reports on System-User usage. The information in the Company Information Table will be unique for each company that uses the invention. Examples of fields that might be included in the table are:

| | | |
|---|---|---|
| Division | char (20) | Division Name |
| Department | varchar (50) | Department Name |
| offno | char (3) | Office Number |
| offname | varchar (50) | office name |
| DD | varchar (50) | Department Director |

11. The User Information Table

The User-ID Table contains specific information about each USER ID including information that links the ID in the cookie field in the Main Table to the office information in the Company Information Table.

The fields of the USER ID Table are as follows:

| | | |
|---|---|---|
| user_id | varchar (8) | User ID |
| offno | varchar (5) | Office Number |
| los | int | Length of Service (in years) |

Stored Procedures

SQL's stored procedures are used to generate the tables, add, change or delete data in tables, create summary tables, and create the system-user reports. The system's stored procedures are as follows:

Get Exec Summary

Function: Gets the Executive summary for given Date Range, including Total Visit Count, Total Request Count, Average Visit Count, Requests per Visit.

Inputs: Start_Date int, End_Date int

Outputs: Visit_Count, Avg_Visit_Duration, req_count, req_per_visit

Get Unique User IDs

Function: Gets the Unique User IDs, sorted by number of requests made, within a given date range Inputs: Start_Date int, End_Date int Outputs: Cookie Get Usage by User IDs Function: Gets the total requests, User ID, User Name, and Office Number sorted by number of requests made, within a given date range Inputs: start_date int, end_date in Outputs: tot_req, cookie_text, User Id, office_number, user_name Get Requests by User Id Function: Gets detailed path (each request made) of the given User ID during the given date range.

Inputs: user_id varchar (15), start_date int, end date int

Outputs: cookie_text, off_name, office_number, user_name, req_timestamp, request_text Get Req by User for Office Function: Gets a summary of all the requests within the given date range for the given Office, User ID, Number of requests made, office_number, user_name, District Name Inputs: officeno varchar (4), start_date int, end_date int Outputs: office_number, offname, cmplx_name, user_name, user_id, tot_req Get Requests by Hour Function: gets the number of requests, sorted by hour of day, for the date range given. The maximum number of records this Stored Procedure outputs is 24.

Inputs: start_date int, end_date int

Outputs: hour_of request, num_requests

Get Users by User Type

Function: Gets all the Users sorted by User Type and number of requests

Inputs: start-date int, end date int, user_type char (4)

Outputs: Cookie, num_requests

Get Multiday Smry

Function: Goes against visits_for_hour, the daily summary table, and gets all the summary fields for each day. Returns one row for each day. The names of the output fields should be self-explanatory.

Inputs: start_date int, end_date int

Outputs: the_date, total_requests, requests_for_hour, requests_hour, requests_hour, requests_for_hour, requests_for_hour, requests_for_hour, requests_for_hour, requests_for hour, requests for hour, requests for hour 10, requests for hour 11, requests_for_hour 12, requests_for_hour 13, requests_for_hour 14, requests_for_hour 15, requests_for_hour 16, requests_for_hour 17, requests_for_hour 18, requests_for_hour 19, requests_for_hour 20, requests_for_hour 21, requests_for_hour 22, requests_for_hour 23, requests_for_hour 24, total_visits, visit_duration, visits_for_hour, visits_for_hour, visits_for_hour, visits_for_hour, visits_for_hour, visits_for_hour, visits_for_hour, visits_for_hour 7, visits_for_hour, visits_for_hour, visits_for_hour 10, visits_for_hour 11, visits_for_hour 12, visits_for_hour 13, visits_for_hour 14, visits_for_hour 15, visits_for_hour 16, visits_for_hour 17, visits_for_hour 18, visits_for_hour 19, visits_for_hour 20, visits_for_hour 21, visits_for_hour 22, visits_for_hour 23, visits_for_hour 24, total_users, users_for_hour 1, users_for_hour 2, users_for_hour 3, users_for_hour 4, users_for_hour 5, users_for_hour 6, users_for_hour 7, users_for_hour 8, users_for_hour 9, users_for_hour 10, users_for_hour 11, users_for_hour 12, users_for_hour 13, users_for_hour 14, users_for_hour 15, users_for_hour 16, users_for_hour 17, users_for_hour 18, users_for_hour 19, users_for_hour 20, users_for_hour 21, users_for_hour 22, users_for_hour 23, users_for_hour 24, total_bandwidth, bandwidth_for_hour, bandwidth_for_hour, bandwidth_for_hour, bandwidth_for_hour, bandwidth_for_hour, bandwidth_for_hour, bandwidth_for_hour 7, bandwidth_for_hour 8, bandwidth_for_hour 9, bandwidth_for_hour 10, bandwidth_for_hour 11, bandwidth_for_hour 12, bandwidth_for_hour 13, bandwidth_for_hour 14, bandwidth_for_hour 15, bandwidth_for_hour 16, bandwidth_for_hour 17, bandwidth_for_hour 18, bandwidth_for_hour 19, bandwidth_for_hour 20, bandwidth_for_hour 21, bandwidth_for_hour 22, bandwidth_for_hour 23, bandwidth_for_hour 24, Get Multiday Tab Summary
Function: Gets the tab summary from the Tab Summary Table for the given date range, including the tab name, the actual content requested (sorted by the number of requests to that content), and the number of requests to the content.
Inputs: which tab char(15), start_date int, end_date int
Outputs: which_tab, content, total_requests Update Daily Summary Table
Function: This stored procedure is run after a day's worth of logs are fully imported into the WARS database. IT updates the Daily Summary Table with one row per day of summary information, such as number of requests, number of visits, average visit duration, requests by hour of day, visits by hour of day, bandwidth by hour of day, etc. The stored procedure also populates another table called Daily Tab Summary Table by calling another stored procedure (see below) called Update Daily Tab Summary Table
Inputs: which date char(8)
Outputs: N/A Update Daily Function Summary Table
Function: This stored procedure is run after a day's worth of logs are fully imported into the WARS database. IT updates a table called Daily Function Summary Table with the individual content requested by the user, along with the number of requests made.
Inputs: which date_int, which_tab int, Content_Param1 varchar(100), Content_Param2 varchar (1100), Content_Param3 varchar(100), Content_Param4 varchar (100), Content_Param5 varchar(100), Content_Param6 varchar(100), Content_Param7 varchar(100), Content_Param8 varchar(100))
Note about Inputs: The Content_Param1—Content Param8 are OPTIONAL parameters. They are substrings that the stored procedure will look for in the Content Requested. If more than one Content_Param is provided, they are OR-ed together. Which_Function is the name of the Function (eg. "ACCOUNTS", that is stored in the Daily Function, Summary Table)
Outputs: N/A Update Daily Summary Table Executive Summary
Function: Run once for each day that imports are run Multiple Web Server Logs can be imported for the same day into the WARS database. When all the imports are complete, this Stored Procedure is run to update the Daily Summary Table. Stored Proc Runs this Stored Proc. which populates the Executive Summary fields in the Daily Summary Table for the date indicated, by running a query on the Main Table
Inputs: which_date int Process BCP Data
Function: Places the data just imported into the main table after processing it further; to save space, fields such as the content requested are replaced with its unique identifier from the reference table. For data in the temp_import_table that does not have a unique identifier, the stored procedure creates new entries in the reference tables, and THEN stores the data in the main table Empties the temp_import_table, thereby readying the database for the next import.
Inputs: None
Outputs: N/A Delete Usage Data
Function: Deletes data from the main table on a nightly basis.
Inputs: Start Date, End Date
Output: N/A Get Average Request per User by Office
Function: Get the average requests per user for each branch office.
Inputs: Start Date, End Date
Outputs: List of branch offices with average requests per user Get Dates in Daily Summary Table
Function: To get the dates from the daily summary table as part of process to provide multi day report
Inputs: Report id, Number of Days to Report on
Outputs: List of branch offices with average requests per use Get Dates in Weekly Summary Table
Function: Get the dates from the weekly summary table as part of the process of multi day report
Inputs: Report id, Number of Days to report on
Outputs: List of Dates Get User Data by Usage
Function: Get the users with the most usage (up to the number of users specified)
Inputs: Start Date, End Date, Number of Users
Outputs: List of Users ordered by usage Get Multi User by Usage
Function: Provide usage data for a specified group of users for a specified date range
Inputs: Start Date, End Date, Up to 50 Users Ids
Outputs: Total requests, User Id, branch office for a specified date range Get Multi Day Browser OS Summary
Function: Provide report of browser os and total requests for a specified range of dates
Inputs: Report ID, State Date, end Date
Outputs: Browser os and number of requests for the specified date range Get Number Users from Weekly Summary
Function: Provide a report of the number of unique users for a specified date range
Inputs: Report Id, Start Date, End Date
Outputs: Number of unique users for a specified date range Get Peak Day Requests
Function: To provide the number of requests for the peak day within a given date range
Inputs: Report Id, Start Date, End Date
Outputs: Peak usage date and number of requests for the peak usage day within a given date range Get Peak Hour Requests
Function: To get the peak hour and number of requests within a given date range
Inputs: Report Id, Start Date, End Date
Outputs: Peak hour of the day and number of requests within a given date range Get Precalc Multi Day Summary
Function: To get the number of requests by hour, by day, number of visits, and the average visit duration for the time period within a given date range
Inputs: Report Id, Start Date, End Date
Outputs: Requests per hour, visits per hour, request per day, visits per day, average visit duration, bandwidth used per day within a given date range Get Top Users by Function Usage
Function: To get the users with the highest number of requests for a given function for a given date range
Inputs: Start Date, End Date, Number of Users, function used
Outputs: User Id, Number of Requests Get Users by Function Usage for Office
Function: To get the total requests for a function by the users in a branch office for a date given date range
Inputs: Start Date, End Date, Office Id, Function to be reported on
Outputs: User Ids, Number of Requests
Update Weekly Summary Table
Function: To update the table for a specific week with the number of unique users visiting the site.
Information comes from the main table
Inputs: Start of Week, End of Week
Outputs: N/A

What is claimed is:

1. A computer-based system comprising:
a content request component for capturing content requests made by users of one or more web servers;
an analysis server containing a database comprising:
a main table operative to store a unique identifier for each of said content requests, and
one or more reference tables operative to store each of said unique identifiers and to associate each identifier with a corresponding content request;
a collection component operative to:
retrieve said content requests,
locate in said one or more reference tables unique identifiers corresponding to said retrieved content requests, and
load said located unique identifiers into said main table; and
a display component operative to display information stored in said database;
wherein said main table is configured to contain composite data corresponding to a selected time interval, wherein said composite data is mapped to unique identifiers to facilitate aggregation reports.

2. A system as in claim 1, wherein said specified data types consist of graphic image files.

3. A system as in claim 1, wherein said specified data types comprise graphic image files.

4. A system as in claim 1, wherein said database is operative to decompress incoming compressed files and to test and discard unrecognized formats.

5. A system as in claim 1, wherein said database is operative to use a bulk copy load utility to place data into a temporary SQL table.

6. A system as in claim 1, wherein said database is operative to run an import program that tests for a unique identifier.

7. A system as in claim 1, wherein said database further comprises a summary table configured to contain aggregated information regarding functions and usage, wherein said aggregated information is collected over selected time intervals.

8. A system as in claim 1, wherein said one or more reference tables store actual data linked, via unique identifiers, to said main table.

9. A system as in claim 1, further comprising a local data collection server in communication with said one or more web servers and with said analysis server.

10. A system as in claim 9, wherein said analysis server is remotely located from said local data collection server and said one or more web servers.

* * * * *